US012598560B2

(12) United States Patent
El Hajj et al.

(10) Patent No.: US 12,598,560 B2
(45) Date of Patent: Apr. 7, 2026

(54) SMART ADAPTION OF TRANSMITTER PROPERTIES WITH RESPECT TO REGULATORY LIMITS FOR RADIATED POWER

(71) Applicant: Intel Corporation, Santa Clara, CA (US)

(72) Inventors: Walid El Hajj, Antibes (FR); Nawfal Asrih, Mandelieu-la-Napoule (FR); Manuel Blazquez De Pineda, Antibes (FR); Wilfrid Dangelo, Mougins (FR); Mythili Hegde, Bangalore (IN); Noam Kogos, Ramat Hasharon (IL); Ronen Kronfeld, Shoham (IL); Gil Meyuhas, Tel-Aviv (IL); Robert Paxman, Hillsboro, OR (US); Ehud Reshef, Kiryat Tivon (IL); John Roman, Hillsboro, OR (US); Rony Ross, Haifa (IL); Amir Rubin, Kiryat Ono (IL)

(73) Assignee: Intel Corporation, Santa Clara, CA (US)

( * ) Notice: Subject to any disclaimer, the term of this patent is extended or adjusted under 35 U.S.C. 154(b) by 521 days.

(21) Appl. No.: 18/065,628

(22) Filed: Dec. 14, 2022

(65) Prior Publication Data

US 2024/0205844 A1 Jun. 20, 2024

(51) Int. Cl.
*H04W 52/36* (2009.01)
(52) U.S. Cl.
CPC .................................. *H04W 52/367* (2013.01)

(58) Field of Classification Search
CPC .......................... H04W 52/367; H04W 52/146
See application file for complete search history.

(56) References Cited

U.S. PATENT DOCUMENTS

2022/0295422 A1* 9/2022 Wang .................. H04W 52/365

FOREIGN PATENT DOCUMENTS

CN 118044302 A * 5/2024

* cited by examiner

*Primary Examiner* — Zhitong Chen
(74) *Attorney, Agent, or Firm* — Viering, Jentschura & Partner mbB

(57) ABSTRACT

Disclosed herein are devices, methods, and systems for adjusting transmit properties based on compliance metrics for human exposure to radiation. As one example, the system determines a first transmission power limit associated with transmissions on a first radio resource, wherein the first transmission power limit is based on a first compliance level threshold of human exposure to emitted radiation when using the first radio resource. The system determines a second transmission power limit associated with transmissions on a second radio resource, wherein the second transmission power limit is based on a second compliance level threshold of human exposure to emitted radiation when transmitting using the second radio resource. The system also controls a wireless device to select either the first radio resource or the second radio resource for a transmission from the wireless device based on the first transmission power limit and the second transmission power limit.

17 Claims, 13 Drawing Sheets

600

1300

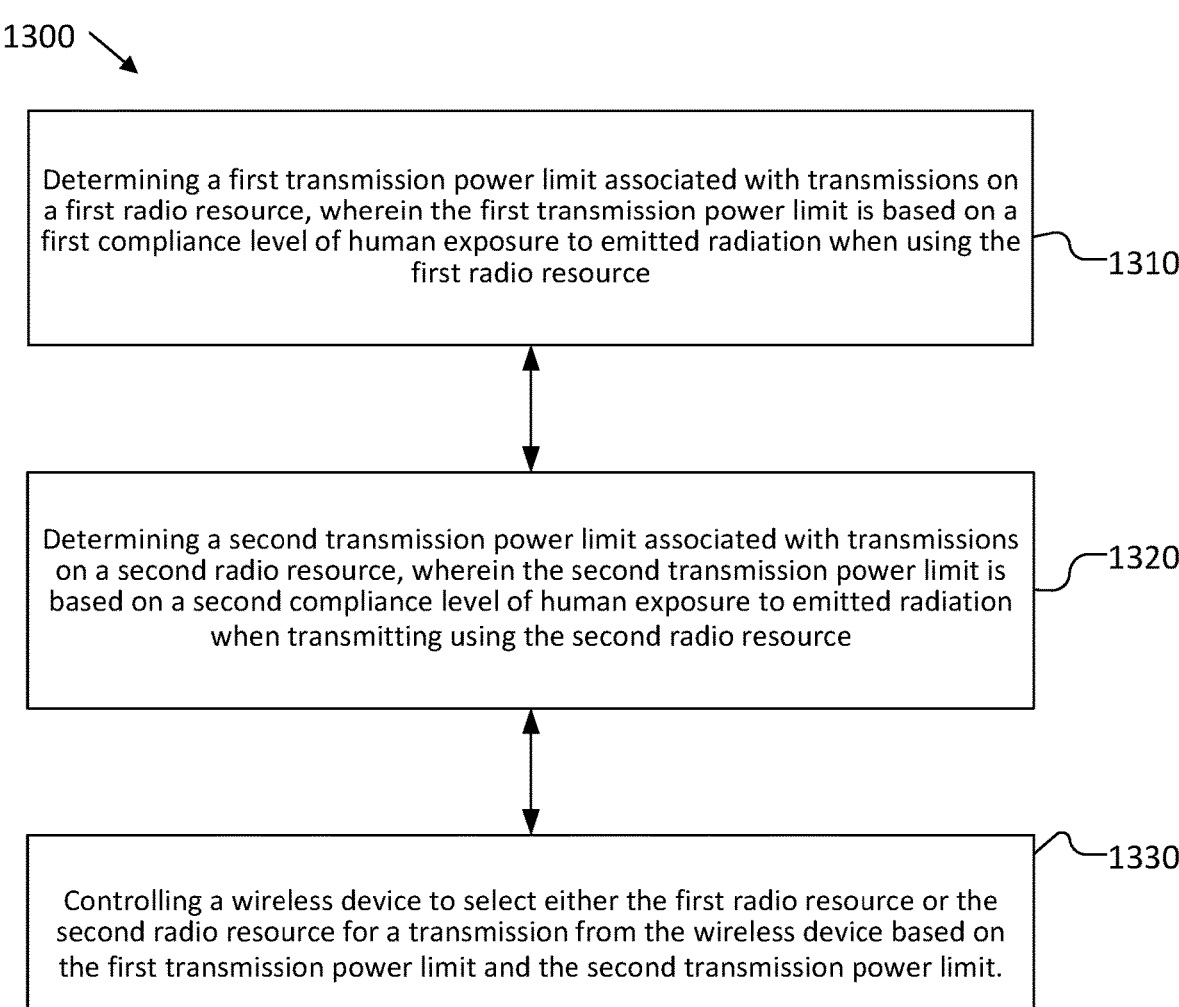

Determining a first transmission power limit associated with transmissions on a first radio resource, wherein the first transmission power limit is based on a first compliance level of human exposure to emitted radiation when using the first radio resource ⸻1310

Determining a second transmission power limit associated with transmissions on a second radio resource, wherein the second transmission power limit is based on a second compliance level of human exposure to emitted radiation when transmitting using the second radio resource ⸻1320

Controlling a wireless device to select either the first radio resource or the second radio resource for a transmission from the wireless device based on the first transmission power limit and the second transmission power limit. ⸻1330

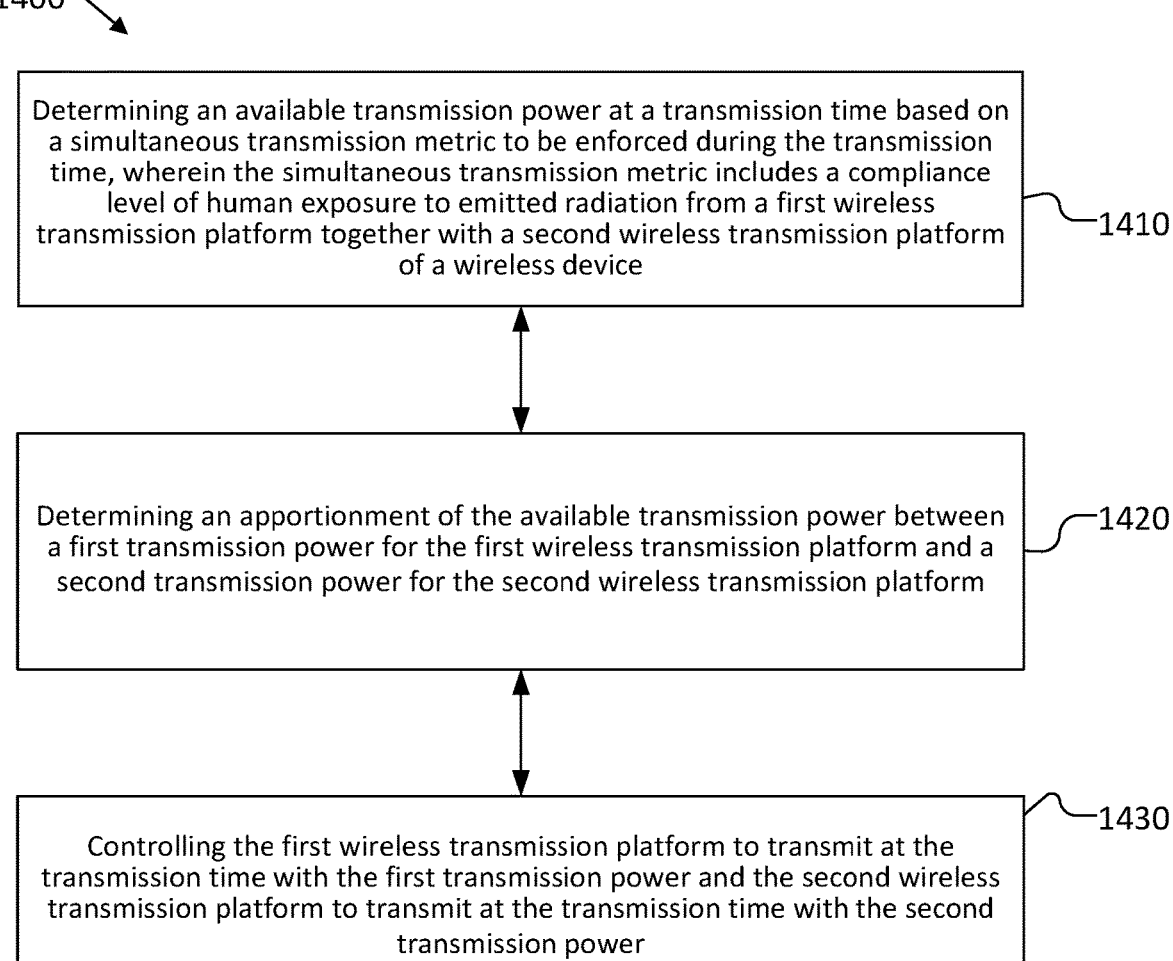

Determining an available transmission power at a transmission time based on a simultaneous transmission metric to be enforced during the transmission time, wherein the simultaneous transmission metric includes a compliance level of human exposure to emitted radiation from a first wireless transmission platform together with a second wireless transmission platform of a wireless device ⟋1410

Determining an apportionment of the available transmission power between a first transmission power for the first wireless transmission platform and a second transmission power for the second wireless transmission platform ⟋1420

Controlling the first wireless transmission platform to transmit at the transmission time with the first transmission power and the second wireless transmission platform to transmit at the transmission time with the second transmission power ⟋1430

FIG. 14

SMART ADAPTION OF TRANSMITTER PROPERTIES WITH RESPECT TO REGULATORY LIMITS FOR RADIATED POWER

TECHNICAL FIELD

The disclosure relates generally to radiated emissions from wireless devices, and in particular, to techniques for adjusting transmitter properties to comply with regulatory limits on human exposure to radiated power.

BACKGROUND

Generally, wireless devices may emit electromagnetic radiation, especially during a wireless transmission, that may be absorbed by users of the wireless device or nearby persons. If the wireless emissions are high, they may be harmful to the user of the device or those nearby. As a result, many jurisdictions place regulatory limits on wireless emissions from user devices. Generally, to measure and enforce compliance levels for human exposure to emitted radiation from wireless devices, metrics such as Specific Absorption Rate (SAR) or power density (PD) may be used for monitoring device emissions. In order to comply with standards that set forth compliance levels for such metrics, a user device (e.g., a mobile phone, a laptop, a wearable device, a user equipment, etc.) may lower its transmission power to comply with the particular metric, and additional/different power reductions may be needed to satisfy each metric, depending on the type of technology, frequency band, jurisdiction, etc. However, if transmission power is reduced to comply with a regulatory requirement, this may lead to performance degradation and ultimately to an unacceptable user experience.

BRIEF DESCRIPTION OF THE DRAWINGS

In the drawings, like reference characters generally refer to the same parts throughout the different views. The drawings are not necessarily to scale, emphasis instead generally being placed upon illustrating the exemplary principles of the disclosure. In the following description, various exemplary aspects of the disclosure are described with reference to the following drawings, in which:

FIG. 13 depicts a schematic flow diagram of an exemplary method for a smart adaption system for adjusting transmit properties based on compliance metrics for human exposure to radiation; and FIG. 14 depicts a schematic flow diagram of an exemplary method for a smart adaption system for adjusting transmit properties based on compliance metrics for human exposure to radiation.

DESCRIPTION

Figure 1:
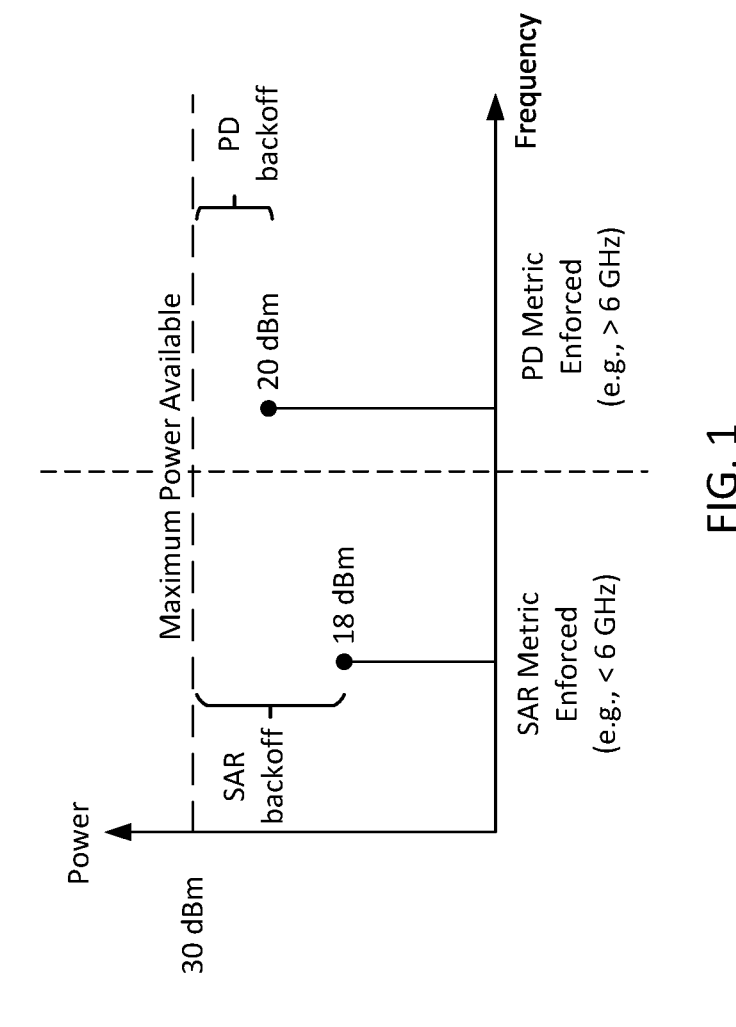
FIG. 1 shows an example of how different frequency ranges may involve different regulatory metrics and different allowed transmit powers associated therewith.

The following detailed description refers to the accompanying drawings that show, by way of illustration, exemplary details and features.

The word "exemplary" is used herein to mean "serving as an example, instance, or illustration." Any aspect or design described herein as "exemplary" is not necessarily to be construed as preferred or advantageous over other aspects or designs.

Throughout the drawings, it should be noted that like reference numbers are used to depict the same or similar elements, features, and structures, unless otherwise noted.

The phrase "at least one" and "one or more" may be understood to include a numerical quantity greater than or equal to one (e.g., one, two, three, four, [ . . . ], etc.). The phrase "at least one of" with regard to a group of elements may be used herein to mean at least one element from the group consisting of the elements. For example, the phrase "at least one of" with regard to a group of elements may be used herein to mean a selection of: one of the listed elements, a plurality of one of the listed elements, a plurality of individual listed elements, or a plurality of a multiple of individual listed elements.

The words "plural" and "multiple" in the description and in the claims expressly refer to a quantity greater than one. Accordingly, any phrases explicitly invoking the aforementioned words (e.g., "plural [elements]", "multiple [elements]") referring to a quantity of elements expressly refers to more than one of the said elements. For instance, the phrase "a plurality" may be understood to include a numerical quantity greater than or equal to two (e.g., two, three, four, five, [ . . . ], etc.).

The phrases "group (of)", "set (of)", "collection (of)", "series (of)", "sequence (of)", "grouping (of)", etc., in the description and in the claims, if any, refer to a quantity equal to or greater than one, i.e., one or more. The terms "proper subset", "reduced subset", and "lesser subset" refer to a subset of a set that is not equal to the set, illustratively, referring to a subset of a set that contains less elements than the set.

The term "data" as used herein may be understood to include information in any suitable analog or digital form, e.g., provided as a file, a portion of a file, a set of files, a signal or stream, a portion of a signal or stream, a set of signals or streams, and the like. Further, the term "data" may also be used to mean a reference to information, e.g., in the form of a pointer. The term "data", however, is not limited to the aforementioned examples and may take various forms and represent any information as understood in the art.

The terms "processor" or "controller" as, for example, used herein may be understood as any kind of technological entity (e.g., hardware, software, and/or a combination of both) that allows handling of data. The data may be handled according to one or more specific functions executed by the processor or controller. Further, a processor or controller as used herein may be understood as any kind of circuit, e.g., any kind of analog or digital circuit. A processor or a controller may thus be or include an analog circuit, digital circuit, mixed-signal circuit, software, firmware, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions, which will be described below in further detail, may also be understood as a processor, controller, or logic circuit. It is understood that any two (or more) of the processors, controllers, or logic circuits detailed herein may be realized as a single entity with equivalent functionality or the like, and conversely that any single processor, controller, or logic circuit detailed herein may be realized as two (or more) separate entities with equivalent functionality or the like.

As used herein, "memory" is understood as a computer-readable medium (e.g., a non-transitory computer-readable medium) in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, 3D XPoint™, among others, or any combination thereof. Registers, shift registers, processor registers, data buffers, among others, are also embraced herein by the term memory. The term "software" refers to any type of executable instruction, including firmware.

Unless explicitly specified, the term "transmit" encompasses both direct (point-to-point) and indirect transmission (via one or more intermediary points). Similarly, the term "receive" encompasses both direct and indirect reception. Furthermore, the terms "transmit," "receive," "communicate," and other similar terms encompass both physical transmission (e.g., the transmission of radio signals) and logical transmission (e.g., the transmission of digital data over a logical software-level connection). For example, a processor or controller may transmit or receive data over a software-level connection with another processor or controller in the form of radio signals, where the physical transmission and reception is handled by radio-layer components such as RF transceivers and antennas, and the logical transmission and reception over the software-level connection is performed by the processors or controllers. The term "communicate" encompasses one or both of transmitting and receiving, i.e., unidirectional or bidirectional communication in one or both of the incoming and outgoing directions. The term "calculate" encompasses both "direct" calculations via a mathematical expression/formula/relationship and 'indirect' calculations via lookup or hash tables and other array indexing or searching operations.

As noted above, a user equipment that is subject to regulatory limits to electromagnetic emissions may need to lower its wireless transmission power to comply with the particular regulatory metric. Depending on how the transmission power is reduced, this may lead to performance degradation and a bad user experience. This becomes particularly challenging where there may be a significant number of wireless subsystems on a single device that may be emitting radiation at different frequencies. Depending on the jurisdiction and/or the transmission frequency, different metrics may be used for monitoring compliance, where for example, a specific absorption rate (SAR) metric may be used in one jurisdiction and/or for one frequency band, whereas a power density (PD) metric may be used in another jurisdiction and/or for a different frequency band. For example, in a higher frequency range (e.g., high gigahertz (GHz) bands), the metrics used may allow for a higher output power as compared to the lower frequency ranges (e.g., megahertz (MHz) and low gigahertz bands). As an example of a regional difference, Europe uses SAR metrics for determining compliance of transmissions at frequencies of up to 10 GHz and PD metrics at frequencies above 10 GHz. In the United States and Canada, however, SAR metrics are used at frequencies of up to only 6 GHz and PD metrics at frequencies above 6 GHZ. As should be understood, in some regions, SAR and Absorbed PD (APD) are called basic restrictions metrics, while Incident PD (IPD) is called a reference level.

Because different metrics may be used at different frequencies, there is not necessarily a single output power level that is necessarily complaint at all frequencies and in all jurisdictions. In other words, depending on the particular frequency and the particular metric used, compliance does not necessarily lead to the same power output at all frequencies and in all regions. In addition, given that a number of different radio technologies may be included in a single user device, each of which may be transmitting at any given time (e.g., a Wi-Fi subsystem, a cellular subsystem, a Bluetooth subsystem, etc.), this may create a composite exposure, where the particular compliance metric for human exposure must be met for the composite effects of a simultaneous transmission from multiple different radio technologies in the same user equipment.

Conventional solutions to ensuring compliance of a user device to a required human exposure metric are inadequate, as they typically use a fixed power back-off margin to ensure that transmissions stay within compliance levels. In addition, some conventional solutions use Proximity Sensing (PS) or Time Averaging (TA) to back off the power only at times where necessary (e.g., where compliance metrics are applicable only when a human is within a certain proximity to the device or only over a particular duration). These conventional techniques may not be optimal because a static power reduction, for example, assumes worst-case situations that may not always apply, such that output power may be unnecessarily reduced. In addition, conventional techniques may not account for technology coexistence, which may lead to additional costs and complexities related to implementation and certification.

Unlike conventional systems, the disclosed smart adaption system may dynamically adjust transmission properties (e.g., transmission power, frequency, etc.) based on the particular human exposure compliance metric or the particular transmission (e.g., taking into account the frequency of the transmission and/or the jurisdiction in which the transmission occurs). For example, if the range of possible transmission frequencies of a given device spans multiple different human exposure metrics ranges, the smart adaption system may select the transmission frequency that optimizes transmission performance (e.g., at the frequency that allows the highest output power for the associated metric). In other words, the user device may switch to a different technology and/or different frequency band based on the different allowed transmission power under the corresponding human exposure compliance metric for the particular technology/frequency.

By leveraging the diversity of human exposure assessment metrics for different jurisdictions, frequencies, and radio-access technologies, the smart adaption system may set the transmission parameters (e.g., transmission power) to an optimized level. This, in turn, may allow the user equipment to maintain compliance (e.g., the user equipment operates below a compliance level threshold of human exposure to emitted radiation) to human exposure limits of the particular region/frequency band while improving performance (e.g., improved transmission quality, improved throughput, reduced latency, etc.). This aspect of the smart adaption system, discussed in more detail below, need not necessarily add equipment costs because these aspects may be added to user devices based on existing hardware. In addition, the smart adaption system may be universally applicable to any type of wireless technology and any type of user equipment (e.g., any type of size, form factor, etc.).

As noted above, conventional solutions to human exposure compliance typically assume, in the case of multiple wireless subsystems that may be transmitting simultaneously, the worst-case scenario for possible simultaneous transmission, and set a fixed back-off for this worst-case scenario in order for the user device to operate below a compliance level threshold. This may lead to a lower-than-necessary radio transmission power for all of the multiple wireless subsystems, and as a result, diminished performance and a bad user experience. Existing techniques such as PS or TA-SAR may minimize the times and length of transmit power back-offs to improve performance while maintaining emissions below a compliance level threshold, but they do not address simultaneous/coexistence transmissions and instead assume a worst-case wireless transmission, often leading to higher power reductions than are necessary for the actual circumstances. In addition, existing SAR techniques may manage multiple, simultaneous transmissions using a centralized SAR (or maximum power exposure (MPE)) manager to monitor each radio technology's workload and network configuration information, balancing power between different technologies in SAR-limited wireless subsystems where an initial SAR assessment is done, and a standalone power reduction is performed. However, these techniques fail to account for contributions to the simultaneous exposure assessment from non-SAR-limited platforms, where no standalone power reduction is required for these types of wireless subsystems.

A non-SAR-limited platform may include devices such as:

Devices that are used at 20 cm (or more) away from the human body. In such cases, SAR or localized PD is not measured and power is generally not limited per technology. For these platforms, compliance to limits on human exposure to radiation that may be assessed by calculating the Maximum Permissible Exposure (MPE) or power density at 20 cm.

Devices that are used within 20 cm from the human body, for which SAR or localized PD is measured but its power output is so small that the device is compliant even at its maximum output. In such cases, there is no need for an individual-backing off of its output power.

As should be understood, devices may have multiple wireless communication systems in a single device, where one or more may be SAR-limited and others may be non-SAR-limited. In the event that the SAR-limited and SAR-non-limited device are transmitting at the same time, the simultaneous transmission may be assessed for compliance to a compliance level threshold by adding each of the different technologies' exposure ratios (MPE/limit) and the sum should be smaller than one. As discussed in more detail below, the smart adaption system may perform a simultaneous power balancing not only for SAR-limited platforms but also together with non-SAR-limited platforms (e.g., platforms where a wireless local area network (WLAN) antenna is on the lid of a laptop and a wide wireless area network (WWAN) antenna is on the base of the laptop). This may be particularly advantageous in power optimizing for coexistence scenarios where an additional power back-off may be needed to ensure compliance to a compliance level threshold for simultaneous transmissions. This may also be used in combination with conventional exposure mitigation techniques such as Time-Averaging SAR (TAS or TA-SAR), where the power back-off may be used to define the TAS parameters by technology.

As discussed in more detail below, the smart adaption system may also implement time-averaging at the host level. Conventional systems tend to ensure human exposure metric compliance to compliance level thresholds on the basis of each individual wireless module, using a static lookup table of required power reductions for scenarios where the human exposure may exceed the specified compliance level threshold. The wireless module may use proximity sensors to detect the physical proximity of a user to the wireless module's antenna, and then reduce its power accordingly. While wireless modules may perform TA-SAR adjustments in "real-time," this is typically performed in the chipset and RF module of each wireless module. A Control Module in the wireless module may perform the monitoring and calculation of time averaging transmission power while the Action Module may enable or disable the dynamic power reduction to be at or below a compliance level threshold for human exposure to emitted radiation. However, because the wireless module is performing SAR-based adjustments, it may not be able to take into account other transmission activities (e.g., in other wireless modules of the user device). This may make the certification process more complex or less efficient because compliance of a user device to applicable SAR-based requirements (e.g., compliance to a compliance level threshold of human exposure to emitted radiation) may need to consider a full range of parameters that could be implemented in the host (e.g., a full range of possible transmission scenarios of the multiple wireless modules).

To overcome this problem, the smart adaption system may implement the Control and Action Modules at the host level in order to increase flexibility for adapting SAR-related adjustments to the entire device and reduce dependency on each wireless module (e.g., each chipset manufacturer) to make appropriate SAR-related adjustments, especially in scenarios where a user device has multiple wireless modules, possibly of differing wireless technologies and possibly from different vendors. As a result, the smart adaption system may provide effective instantaneous power averaging calculation latency between the wireless module to the host-level TAS Control Module, avoid power variations that may trigger latency from the TAS Action Module to the wireless module, and avoid host states transition latency (e.g., from sleep mode to active mode). This may be accomplished, for example, by controlling the algorithm time granularity, reducing power sampling at chipset level while considering a controlled error, taking margins when defining TAS parameters, etc. In addition, these techniques of the smart adaption system may reduce dependency on particular wireless chipset manufacturers, especially in coexistence of multiple technologies/module vendors that may be in a single user device, increasing flexibility, simplifying the certification process, and allowing for differentiation among original equipment manufacturers.

As discussed in more detail below, the smart adaption system may also adjust an overall power budget of a user device that has multiple communication subsystems so as to prioritize the user's experience or other system-wide goals. For example, if a given wireless module of a user device is limiting power according to SAR compliance level thresholds, according to time-averaging SAR (TA) compliance level thresholds, according to any other regulatory limits to transmission power, or according to any other interference power limitation, the transmission may still consume a portion of the overall energy budget and superposed Equivalent Isotropic Radiated Power (EIRP) that must be enforced over the combined multiple transmission (e.g., by transmissions that share the same antennas). Each wireless module may wish to maximize/maintain its own user experience for its own transmissions, while still remaining below a compliance level threshold. However, it may be that the overall communication experience is more important to the user than any single wireless module's transmission.

Nevertheless, in conventional systems, a wireless module is often agnostic to other wireless module's transmissions and to how one wireless module's transmissions may impact the overall budget, the overall user experience, and the overall user preferences. When each wireless module optimizes its own transmissions, not only may this degrade the overall system performance and overall user experience, but it may also require a predefined, static division of the overall energy/power budget that may not be optimal for the current use case, current channel conditions, and current activity of other wireless modules. For example, the predefined division of an overall energy/power budget for a device may not exploit portions of the energy/power that have been set aside for a certain wireless module but which goes unused by that wireless module at a given point in time. This places a performance ceiling on each wireless module, which may mean each is performing below the actually available capacity of the overall system.

To resolve these problems, the disclosed the smart adaption system may obtain a minimum combined throughput (TPT) and latency requirements from each communication system (e.g., each wireless module) and use these as a basis for a budget negotiation for allocating the overall budget to for remaining under compliance level thresholds. Each communication system may compute its own key performance indicators (KPI) to provide its individual throughput and latency requirements/targets for the negotiation/allocation. The disclosed smart adaption system may use algorithms to translate the provided throughput/latency targets to transmission rates and to translate rate targets to transmission power limits based on current channel conditions. The algorithm may combine all transmission power requests from each communication system to make a priority-based power allocation to each communication system. The smart adaption system may use a priority power allocation manager to allocate dynamic power budgets to each communication system, and the power manager may use algorithms to translate throughput/latency to rate. The power manager may also use algorithms to translate rate and acquired channel condition into transmission power. Benefits of such an allocation may include improved throughput, improved latency, improved combined communication system performance to maximize combined overall user experience, improved power consumption due to optimized transmission times, or reduced active time of the overall device.

Frequency Selection Based on Human Exposure Metrics

As noted earlier, the smart adaption system disclosed herein may dynamically adjust transmission properties (e.g., transmission power, frequency, etc.) based on the particular human exposure compliance metric and/or the particular transmission (e.g., taking into account the frequency of the transmission and/or the jurisdiction in which the transmission occurs). For example, if the range of possible transmission frequencies of a given device spans multiple different human exposure metrics ranges, the smart adaption system may select the transmission frequency that optimizes transmission performance (e.g., select the frequency that allows the highest output power for the associated human exposure metrics metric). In other words, the user device may switch to a different technology and/or different frequency band based on the different allowed transmission powers under the corresponding human exposure compliance metric for the particular technology/frequency (e.g., different compliance level thresholds for different technologies/frequencies). To illustrate this aspect, two practical examples will be discussed with reference to FIG. 1 and FIG. 2.

In the first example, assume that a given user device has a wireless communication system that supports Wi-Fi 6E, where some of the Wi-Fi channels operate at frequencies below 6 GHz and some of the Wi-Fi channels operate at frequencies above 6 GHz. If the user device is operating in the United States, the regulatory requirements for human exposure to radiation are given by an SAR metric that specifies the compliance level threshold for the frequencies below 6 GHz and a PD metric that specifies compliance level threshold for the frequencies above 6 GHz. FIG. 1 shows a plot 100 of transmission power over transmission frequency for the Wi-Fi 6E user device. Assume, for example, that the user device is capable of transmitting signals at 30 dBm, its maximum available power. However, due to the regulatory requirements for human exposure to radiation in this jurisdiction, the user device must reduce its transmission power to comply with the given regulatory requirement for the frequency on which it is transmitting (e.g., it must transmit below a particular compliance level threshold). Thus, if the user device is transmitting on a frequency that is below 6 GHZ, the SAR metric is enforced, and the maximum output power is 18 dBm. Thus, the user device must reduce its transmission power from its maximum available power by an SAR-enforced back-off of 12 dBm in order to comply with the SAR metrics. On the other hand, if the user device is transmitting on a frequency that is above 6 GHZ, the PD metric is enforced and the maximum output power is 20 dBm. Thus, the user device must reduce its transmission power from its maximum available power by a PD-enforced back-off of 10 dBm in order to comply with the PD metrics. To take advantage of this difference, the smart adaption system may decide to select (or to request) a transmission frequency above 6 GHz for its current transmission so as to maximize transmission power while also complying with the applicable human exposure radiation metric. Similarly, if a higher power is not desired (e.g., because of a low-demand transmission or low-throughput requirements, where the power will in any event be lower than the compliance level threshold of allowed power for the applicable human exposure radiation metric), the smart adaption system may decide to select (or to request) a transmission frequency below 6 GHz.

Figure 2:
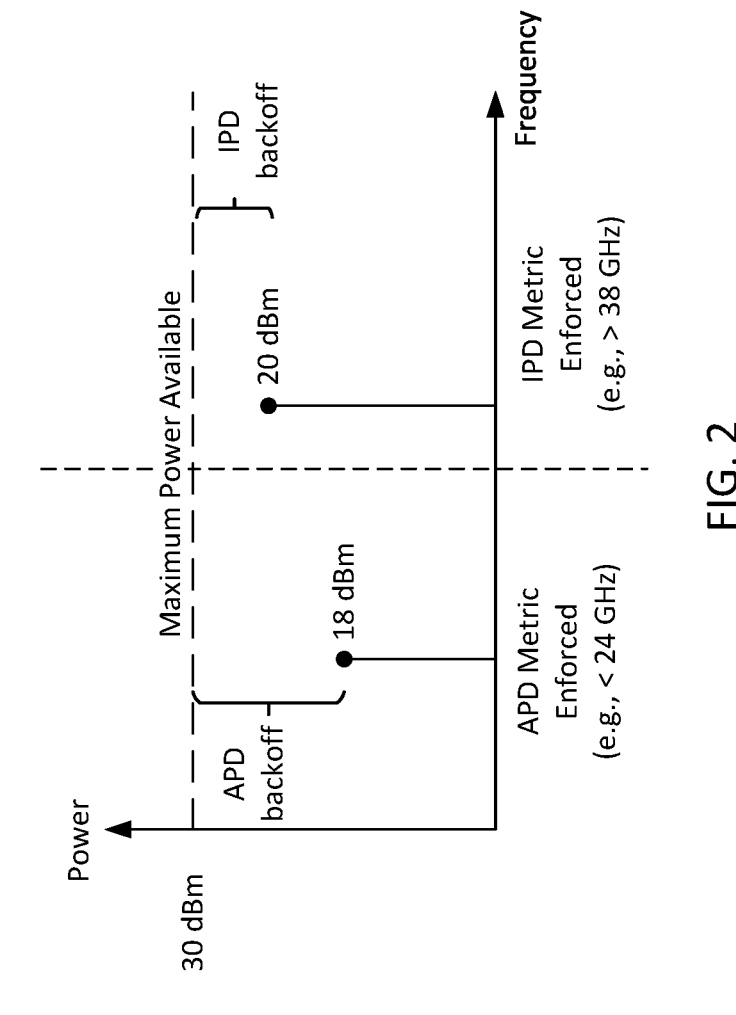
FIG. 2 shows another example of how different frequency ranges may involve different regulatory metrics and different allowed transmit powers associated therewith.

In the second example, assume that a given user device has a wireless communication system that supports 5 GHz FR2 mmW, where one of the available transmission frequency bands is 24 GHz and another frequency band is 38 GHz. In general, an incident PD (IPD) metric (e.g., in free space) may be more practical to assess at higher frequencies (such as in the 38 GHz band) as compared to absorption PD (APD) metric (e.g., in body liquid) because of the penetration depth of the electromagnetic (EM) waves penetration depth. As shown in FIG. 2, plot 200 graphs transmission power over transmission frequency for a user device that supports 5 GHz FR2 mmW. Assume, for example, that the jurisdiction allows devices to use, in compliance with applicable human exposure radiation metrics, an APD assessment in the 24 GHz band and an IPD assessment in the 38 GHz band, where each metric provides for a different transmission power at a different compliance level threshold. As such, the back-off from the user device's maximum available power may be different between the two bands. To take advantage of this difference, the smart adaption system may decide to select (or to request) a transmission frequency in the 38 GHz band as opposed to the 24 GHz band for its current transmission so as to maximize transmission power while also complying with the applicable human exposure radiation metric (e.g., the applicable compliance level threshold). Similarly, if a higher power is not desired (e.g., because of a low-demand transmission or low-throughput requirements, where the power will in any event be lower than the allowed power for the applicable human exposure radiation metric), the smart adaption system may decide to select (or to request) a transmission frequency in the 24 GHz band.

Centralized SAR Manager

As discussed above, the smart adaption system may also manage compliance to metrics (e.g. compliance level thresholds) for human exposure to radiation in cases where the user device may have multiple wireless communication systems (e.g., multiple wireless modules) that transmit simultaneously. The smart adaption system may employ a centralized radiation manager that uses a power balancing algorithm to manage transmission power from the multiple wireless communications that may be simultaneously transmitting. As discussed with respect to FIGS. 3-7 below, the centralized radiation manager may track system workloads and network traffic information from multiple communication systems to determine a power balancing solution for the multiple communication systems.

Figure 3:
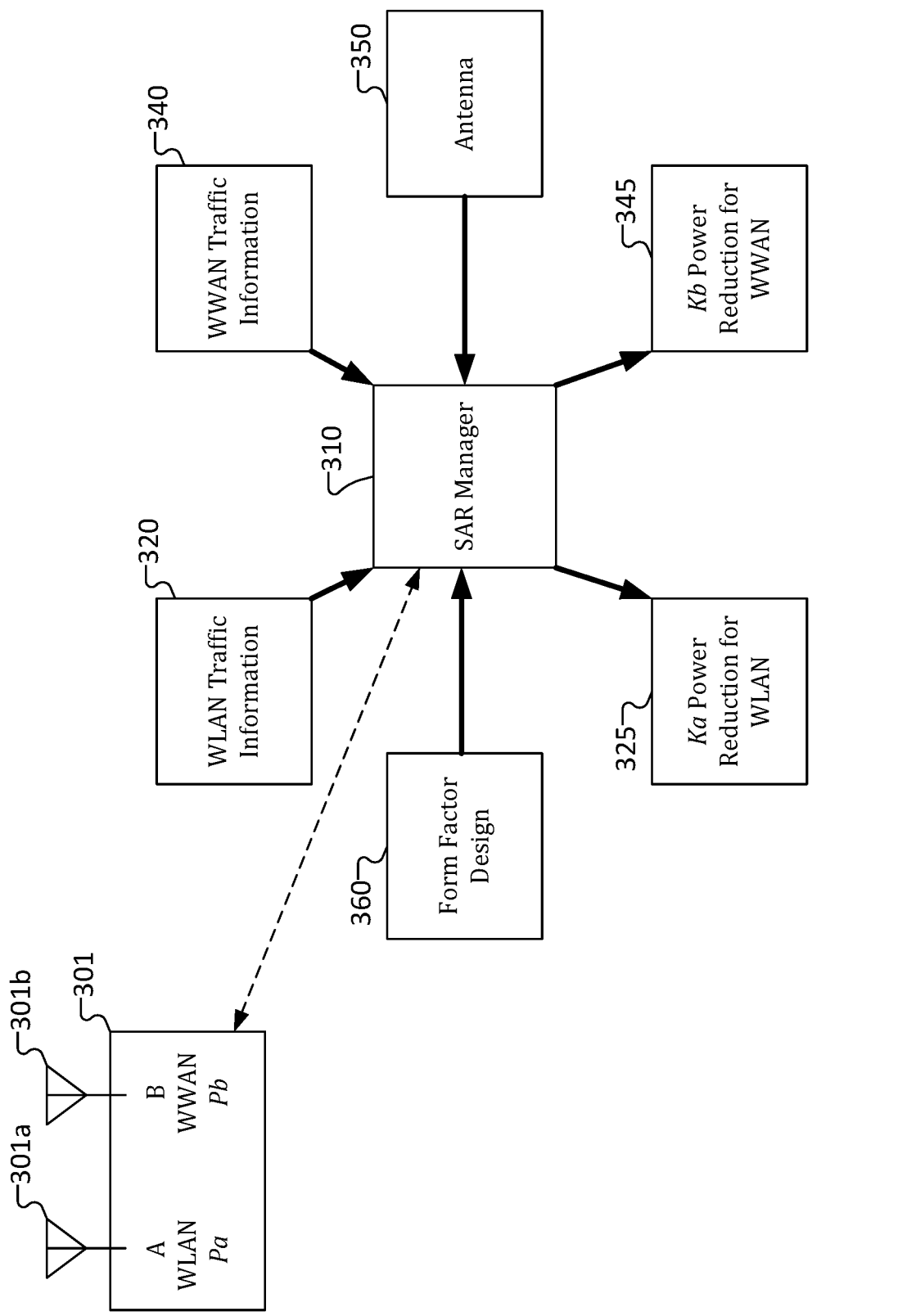
FIG. 3 shows an example of a specific absorption rate (SAR) manager that may collect information about simultaneous transmissions and adjust the output power of each transmission accordingly.

FIG. 3 shows an example of a smart adaption system that uses a centralized radiation manager (e.g., SAR manager 310) for a user device 301 that has two communication systems, an "A" system that supports WLAN communications (e.g., a Wi-Fi module) on antenna 301a and a "B" system that supports WWAN communications (e.g., a cellular module) on antenna 301b. The SAR manager 310 may determine that transmission power must be reduced by a certain amount (K) during a given simultaneous transmission on antennas 301a and 301b. So, if the power on antenna 301a is Pa and the power on antenna 301b is Pb, the SAR manager 310 splits the total reduction amount K between a power reduction on antenna 301a (Ka, shown at 325) and a power reduction on antenna 301b (Kb, shown at 345), where Ka+Kb=K. For example, if the simultaneous transmission requires an overall reduction K of 6 dB, the SAR manager 310 may split this 6 dB between antenna Ka and Kb. As examples: Ka=1 and Kb=5; Ka=2 and Kb=4; Ka=3 and Kb=3, etc. To determine this allocation, the SAR manager 310 may receive traffic information about the first communication system (e.g., WLAN traffic information 320) and the second communication system (e.g., WWAN traffic information 340), where the SAR manager 310 may base the allocation on the WLAN traffic information 320 and the WWAN traffic information 340 (e.g., to identify transmission times for and respective transmission powers of each of the simultaneous transmissions). The SAR manager 310 may also receive information about and may base the allocation on other aspects, such as the form factor 360 of the user device and non-SAR platforms that may be transmitting on antenna 350. For example, if the user device is a convertible laptop that is convertible between a tablet mode and a classic laptop mode, the SAR manager may receive sensor information indicating the current mode and adjust the allocation based on the current mode.

Figure 4:
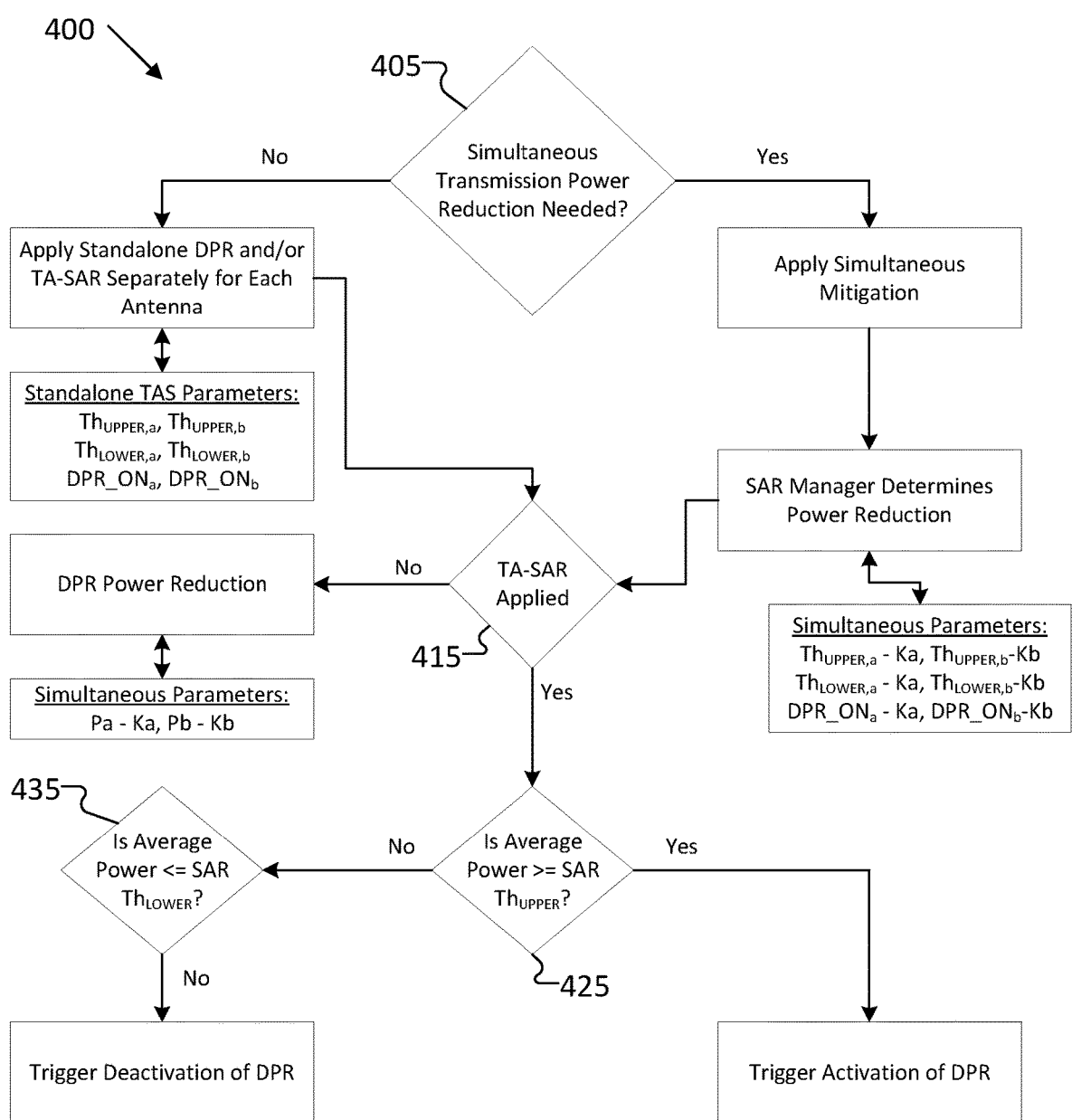
FIG. 4 shows an exemplary decision tree for adjusting the output power of simultaneous transmissions from multiple sources.
Figure 5:
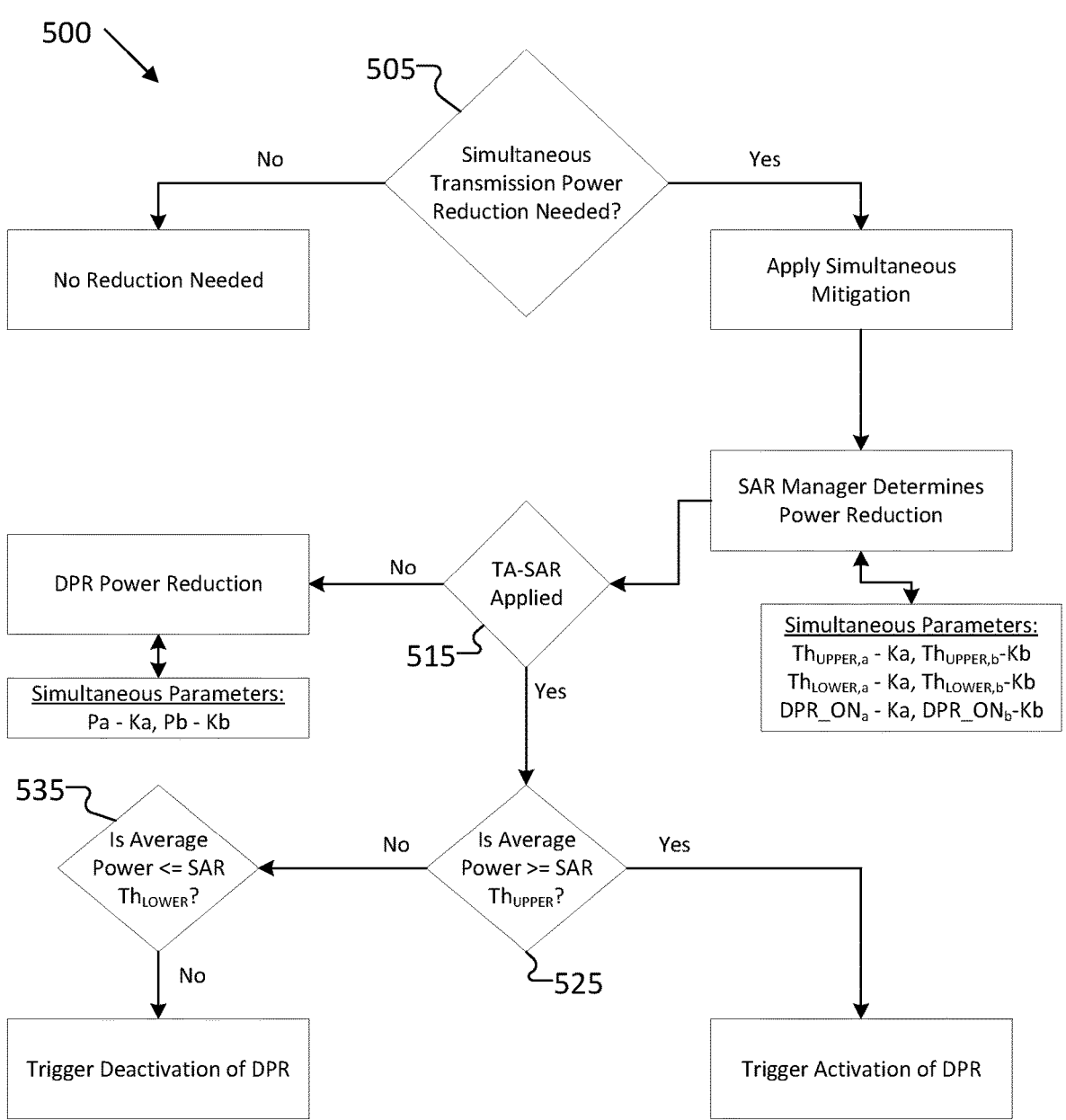
FIG. 5 shows an exemplary decision tree for adjusting the output power of simultaneous transmissions from multiple sources on a user device.

Exemplary decision processes for SAR manager 310 are shown in FIGS. 4-5. FIG. 4 shows an exemplary decision process 400 of the SAR manager 310 that involves a communication system where its transmission power may be regulatory-limited based on one or more human exposure metrics (e.g., SAR-limited to a particular compliance level threshold). FIG. 5 shows an exemplary decision process 500 of the SAR manager 310 that involves a communication system where its transmission power may not need to be regulatory-limited (e.g., non-SAR-limited to any particular compliance level threshold).

Figure 6:
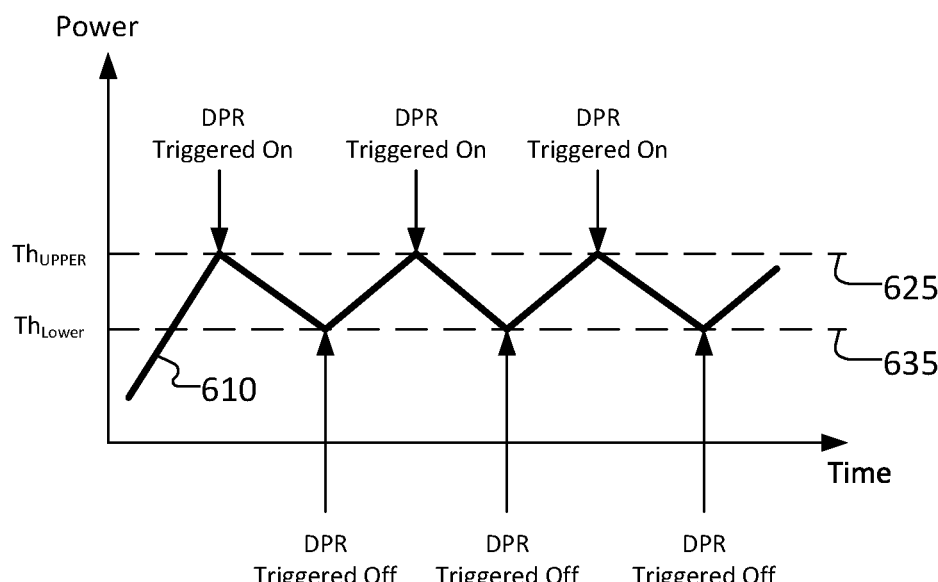
FIG. 6 shows an example of average transmission power plotted over time that triggers dynamic power reduction on/off based on various thresholds.

Referring to FIG. 4, the process 400 starts with a decision in 405, as to whether a simultaneous power transmission is to occur, and if so, whether an overall power reduction is needed/desired to meet a particular regulatory metric (e.g., a compliance level threshold) for human exposure. If there are no simultaneous transmissions or if an overall power reduction is not need/desired, the process 400 may simply apply conventional techniques for ensuring transmission power of each single, independent transmission complies with a given regulatory metric for human exposure. As should be appreciated, this means that each transmission may have a power reduction, e.g., using Dynamic Power Reduction (DPR) and/or TA-SAR, without regard to other transmissions. So, each antenna may independently review the upper threshold ($Th_{UPPER,a}$, $Th_{UPPER,b}$) and lower threshold ($Th_{LOWER,a}$, $Th_{LOWER,b}$) to determine whether and by how much the power of each transmission should be reduced (to $DPR\_ON_a$, $DPR\_ON_b$). DPR_ON may be understood as a parameter of TA-SAR representing the power level when the TA-SAR is at the state when the power should be reduced. As should also be understood, the upper and lower thresholds ($Th_{UPPER}$, $Th_{LOWER}$) define a range in which DPR is enabled. Having a range with an upper threshold for switching DPR on and lower threshold for switching DPR off may provide a hysteresis to minimize switching between DPR on and DPR off to comply with the particular compliance level threshold(s). An example of how the DPR parameters may operate is shown in FIG. 6, where graph 600 shows a plot of average transmission power 610 over time, where as the average transmission power 610 increases and reaches the upper threshold 625 ($\text{Th}_{UPPER}$), DPR is triggered on so as to reduce transmission power. Thereafter, as the average transmission power 610 falls and reaches the lower threshold 635 ($\text{Th}_{LOWER}$), DPR is triggered of so as to allow the transmission power to increase. This process may repeat over time.

Referring again to FIG. 4, if averaging is not used (e.g., no TA-SAR, as determined in 415), the process 400 may simply apply the determined individual power reductions that were based on the instantaneous, individual transmission power. If averaging such as TA-SAR is used, the process 400 may determine whether the average transmission power exceeds the individual upper threshold ($\text{Th}_{UPPER,a}$, $\text{Th}_{UPPER,b}$) and if so, apply the DPR power reduction. If the average transmission power falls below the lower threshold ($\text{Th}_{LOWER,a}$, $\text{Th}_{LOWER,b}$), in 435, then power reduction is no longer needed and the DPR power reduction may be deactivated.

Returning to the top of FIG. 4, if the process 400 decides in 405 that a simultaneous transmission is to occur that requires an overall transmission power reduction to meet a particular regulatory metric (e.g., compliance level threshold) for human exposure, the process 400 may apply a simultaneous mitigation strategy, as discussed above, where the overall power reduction amount K may be allocated among the simultaneous transmissions. So, if the simultaneous transmission is of transmissions on two antennas, antenna A and B, the overall power reduction may be allocated between a power reduction on antenna A (Ka) and a power reduction on antenna B (Kb), as discussed above. Each antenna may also have TA-SAR parameters that include an upper threshold ($\text{Th}_{UPPER,a}$-Ka, $\text{Th}_{UPPER,b}$-Kb) for when a power back-off is enabled and lower threshold ($\text{Th}_{LOWER,a}$-Ka, $\text{Th}_{LOWER,b}$-Kb) for when a power back-off may be disabled and to determine by how much ($\text{DPR\_ON}_a$-Ka, $\text{DPR\_ON}_b$-Kb) the power of each transmission should be reduced. As is clear from these values, the thresholds and power reductions are based on the allocated share ($K_a$, $K_b$) of the overall power reduction (K). This means that each transmission may have an allocated portion of the overall required power reduction. If averaging is not used (e.g., no TA-SAR, as determined in 415), the process 400 may simply apply the determined power reductions to each antenna (to transmission powers of $\text{DPR\_ON}_a$-Ka, $\text{DPR\_ON}_b$-Kb). If averaging such as TA-SAR is used, the process 400 may determine whether the average transmission power exceeds the individual upper threshold ($\text{Th}_{UPPER,a}$-Ka, $\text{Th}_{UPPER,b}$-Kb) and if so, apply the determined DPR power reductions. If the average transmission power falls below the lower threshold ($\text{Th}_{LOWER,a}$-Ka, $\text{Th}_{LOWER,b}$-Kb), in 435, then power reduction is no longer needed and the DPR power reduction may be deactivated.

FIG. 5 shows a process 500 that is similar to process 400 of FIG. 4, except it considers that one of the transmissions may be a non-SAR-limited communication system, where, as noted above, there may not be an associated SAR-based power reduction requirement for its individual transmissions. However, when it has a simultaneous transmission with an SAR-limited communication system, process 500 may need to take into account the otherwise non-SAR-limited transmission in the overall transmission power budget and nevertheless allocate a portion of the overall power reduction to the non-SAR-limited transmission. As can be seen, process 500 also starts with a decision in 505 to determine whether a simultaneous transmission is to occur that requires an overall power reduction to meet a particular regulatory metric for human exposure (e.g., the simultaneous transmission includes at least one SAR-limited transmission). If there are no simultaneous transmissions with the non-SAR-limited transmission or if an overall power reduction is not need/desired, the process 500 need not reduce the transmission power of the non-SAR-limited transmission. On the other hand, if a simultaneous transmission is to occur with an SAR-limited communication system, the process 500 may apply a simultaneous mitigation strategy, as discussed above, where the overall power reduction amount K may be allocated among the simultaneous transmissions. In this case, even the non-SAR-limited transmission may be allocated a portion of the overall power reduction amount. For example, if the simultaneous transmission is of two transmissions, a non-SAR-limited transmission on antenna A and an SAR-limited transmission on antenna B, the overall power reduction may be allocated between a power reduction on antenna A (Ka) and a power reduction on antenna B (Kb), as discussed above, so as to remain under particular compliance level threshold. The remainder of process 500 is the same as process 400, following similar decisions in 515, 525, and 535 that correspond to 415, 425, and 435, respectively, of process 400.

Figure 7:
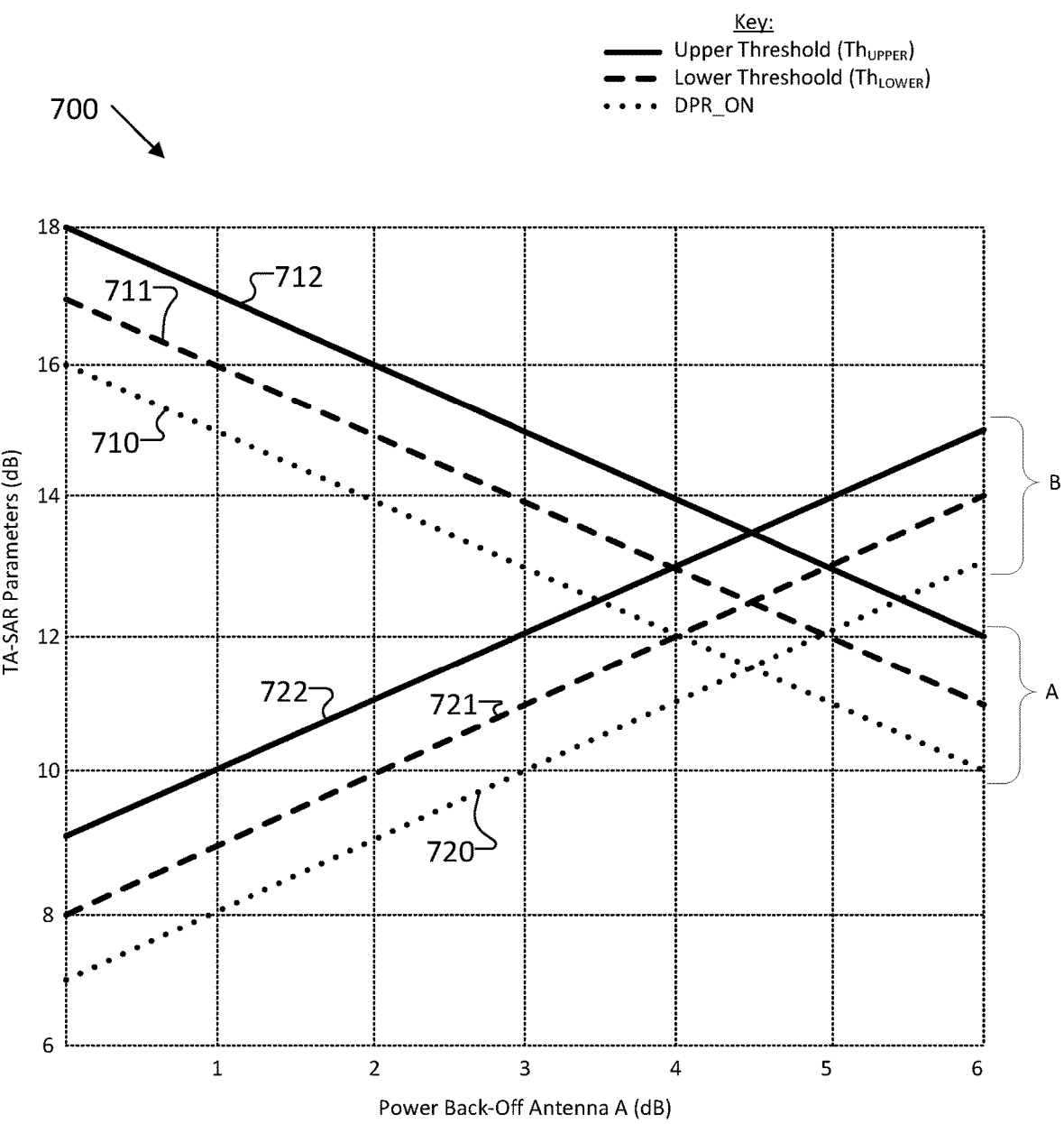
FIG. 7 shows an example of different thresholds associated with adjusting the output power of simultaneous transmissions from multiple sources on a user device.

FIG. 7 shows an exemplary graph 700 of the relationship between TA-SAR parameters (in dB) as a function of power-back off of antenna A (or, inversely, a power gain of antenna B) (in dB). Graph 700 plots the various T-SAR thresholds (for both antenna A and antenna B) that may change depending on the portions of the overall transmission power back-off budget that is allocated to antenna A. Line 712 is the upper threshold associated with antenna A ($\text{Th}_{UPPER,a}$ or $\text{Th}_{UPPER,a}$-Ka), line 711 is the lower threshold associated with antenna A ($\text{Th}_{LOWER,a}$ or $\text{Th}_{LOWER,a}$-Ka), and line 710 is the reduced transmission power when power-reduction is active ($\text{DPR\_ON}_b$ or $\text{DPR\_ON}_b$-Kb). Line 722 is the upper threshold associated with antenna B ($\text{Th}_{UPPER,b}$ or $\text{Th}_{UPPER,b}$-Kb), line 721 is the lower threshold associated with antenna B ($\text{Th}_{LOWER,b}$ or $\text{Th}_{LOWER,b}$-Kb), and line 720 is the reduced transmission power when power-reduction is active ($\text{DPR\_ON}_b$ or $\text{DPR\_ON}_b$-Kb). Looking at a single point on graph 700 as a standalone example, if the upper threshold ($\text{Th}_{UPPER,a}$) is 18 dBm and ($\text{Th}_{UPPER,b}$) is 15 dBm, the amount of reduction K for simultaneous transmission is 6 dB.

Implementation of Time Averaging at Host Level

Figure 8:
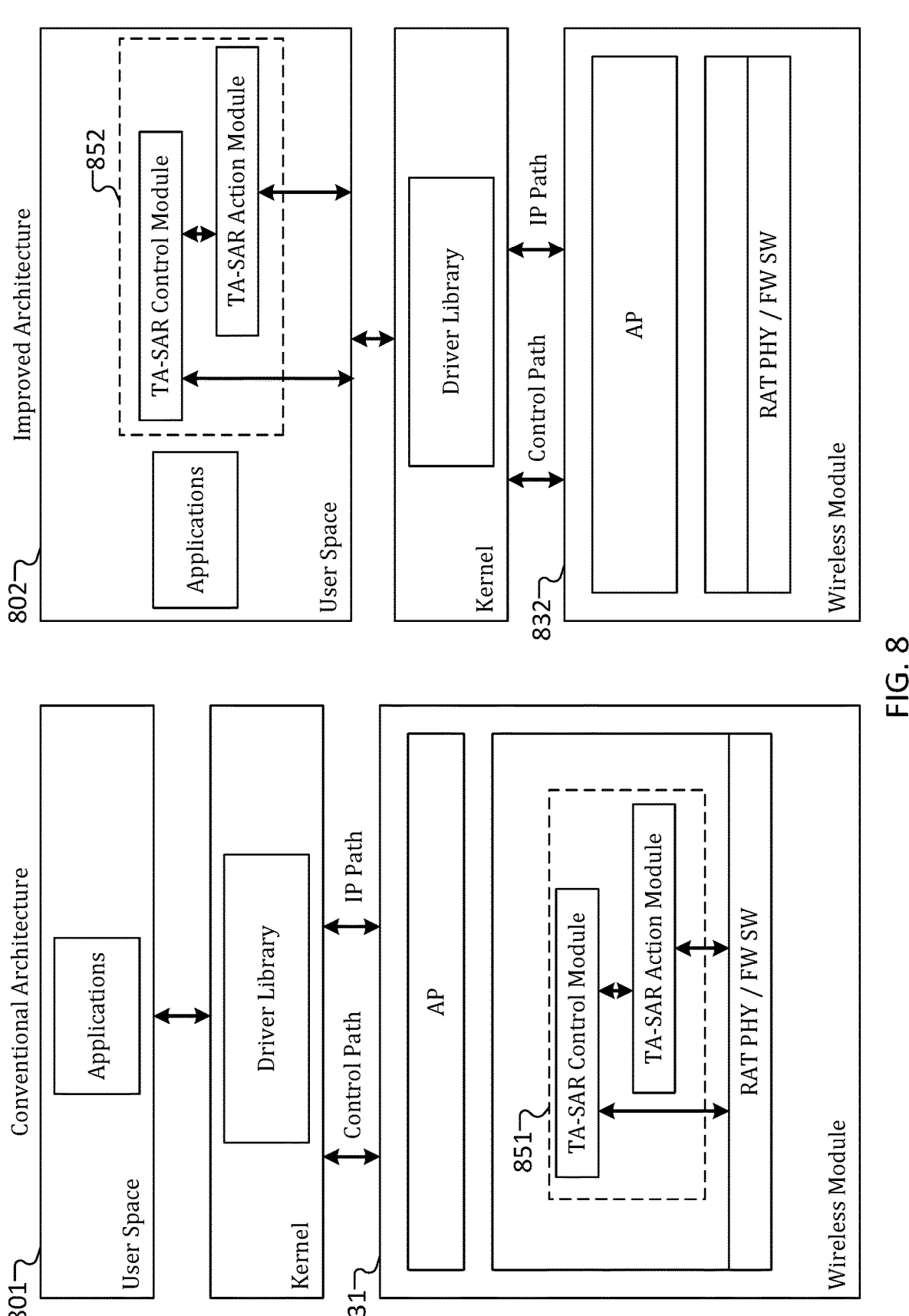
FIG. 8 shows an example of a modified architecture for performing time-averaging on specific absorption rates.

As discussed above, the smart adaption system may implement time averaging of the human exposure metric (e.g., such as a TA-SAR) at a host level as opposed to at the wireless module level. In this manner, each communication system allows the host controller (e.g., the host that sits in a layer above each individual communication system) to monitor TA-SAR and to adapt the power back-off for each communication system jointly rather having each communication system separately perform TA-SAR power back-off to remain compliant with compliance level threshold(s) for human exposure to radiation. As shown, for example, in FIG. 8, a conventional architecture (on the leftmost side of FIG. 8) typically allows each individual communication system (e.g., in wireless module 831) to perform TA-SAR actions and power-control (e.g., in a TA-SAR module 851). TA-SAR module 851 may include a Control Module and an Action Module, where the Control Module may perform the monitoring and calculation of time averaging transmission power while the Action Module may enable or disable the dynamic power reduction based on the calculated time averaging transmission power. The host processor 801 may operate applications in the user space which utilize various wireless modules (e.g., wireless module 831), but the host processor 801 cannot coordinate time averaging of transmission power among multiple wireless modules.

Instead of this conventional architecture, the smart adaption system may employ the improved architecture (on the rightmost side of the FIG. 8), where the TA-SAR module (e.g., TA-SAR module 852) is performed at the host level (e.g., in host processor 802) rather than at the wireless module level (e.g., not in wireless module 832). This means that the Control Module of TA-SAR module 852 may perform the monitoring and calculation of time averaging transmission power by taking into account multiple communication systems (e.g., not just of wireless module 831 but also of other wireless modules of the user device). Likewise, the Action Module may enable or disable the dynamic power reduction for multiple wireless modules, based on the calculated time averaging transmission power from the multiple communication systems.

As a result, the smart adaption system may provide effective instantaneous power averaging calculation latency between wireless module 832 to the Control Module of the TA-SAR module 852, avoid power variations that may trigger latency from the Action Module of the TA-SAR module 852 to the wireless module 832, and avoid state transition (e.g., from sleep mode to active mode) latency in the host processor 802. This may be accomplished, for example, by controlling the algorithm time granularity, reducing power sampling at wireless module level while considering a controlled error, or taking margins when defining TAS parameters, etc. In addition, TA-SAR module 852 may reduce dependency on the particular wireless chipset manufacturers (e.g., of the wireless module 831) for TA-SAR compliance, especially when there may be multiple wireless modules in a given device with the possibility of simultaneous transmissions.

Energy Budgeting to Maintain User-Experience

Figure 9:
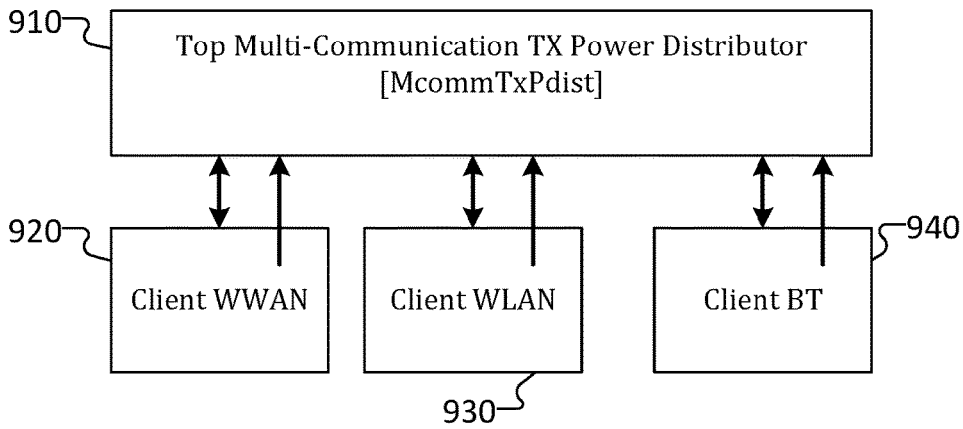
FIG. 9 shows an example of a top-level transmit power controller for allocating transmit power to multiple communication subsystems.

The smart adaption system may also include a transmission power manager for adjusting an overall power budget of a user device that has multiple communication subsystems, where the power manager adjust the power budget based on prioritizing the user's experience or other system-wide, user-device-level goals. A high level example of a transmission power manager 910 is shown in FIG. 9. The transmission power manager 910 ([McommTxPdist]) may communicate information with multiple wireless communication systems (e.g., a client WWAN module 920, a client WLAN module 930, and a client Bluetooth (BT) communication module 940). Based on information collected from each system, the transmission power manager 910 may allocate and provide a portion of an overall power transmission budget (e.g., an overall compliance level threshold) to each wireless communication system.

For example, each of client WWAN module 920, client WLAN module 930, and client Bluetooth (BT) communication module 940 may communicate a transmission power request for a particular transmission time to the transmission power manager 910. For example, the transmission power request may include a minimum transmission power level, a preferred transmission power level, a transmission time, etc. Each individual communication system (e.g., each of client WWAN module 920, client WLAN module 930, and client Bluetooth (BT) communication module 940) may determine/calculate its required minimum transmit power and/or its preferred transmit power in any number of ways. (As should be appreciated, however, this determination may also be done centrally, where each communication system provides its key performance indicators to the transmission power manager 910 that, in turn, calculates a minimum transmit power and/or its preferred transmit power for each communication system. Thus, the descriptions below with respect to the translations performed by each communication system are equally applicable to the translations being performed by the transmission power manager 910).

For example, each communication system may calculate a required minimum and preferred throughput/latency as function of the active link types such as voice, video, best-effort, etc., may then adjust the minimum and preferred throughput/latency to current channel conditions/types, where realized throughput/latency may be impacted by channel quality, congestion, modulation and coding schemes, radio access technology, protocols, etc., and may then translate the adjusted minimum and preferred throughput/latency into its minimum transmit power and/or its preferred transmission power.

To translate the adjusted minimum and preferred throughput/latency into its minimum transmit power and/or its preferred transmission power, each wireless communication system may translate them in any number of ways, including, for example, setting fixed limits, setting semi-fixed limits that vary simply based on a limited number of predefined channel conditions, or calculating the limits dynamically based on the actual channel conditions. As should be appreciated, a dynamically-based approach may more accurately translate the preferred throughput/latency into a minimum transmit power that is required to satisfy the throughput/latency.

The dynamically-based approach may include any number of steps, each of which are discussed below. First, the dynamically-based approach may utilize predefined data primitives (e.g., stored in a database in a memory) that provide a throughput-versus-attenuation [TvA] relationship per different types of channel conditions. Then the dynamically-based approach may perform a linear regression on the slope portion of the TvA. The slope may be stored as an array of slopes, where each slope in the array may be associated with a different channel/rate conditions such as bandwidth, channel/band, fading condition, multipath condition, etc. Next, the dynamically-based approach may receive measurements to analyze or may receive an analysis of the current channel conditions and select a slope from the stored array of slopes that best matches the current channel/rate conditions. Next, the dynamically-based approach may use the selected slope to translate a reduction in transmission power to a reduction in throughput. In other words, the slope defines that for every X dB reduction in transmit power, an expected Y Mbps reduction in throughput. Based on this translation, the dynamically-based approach may calculate a transmission power reduction (e.g., as compared to the last power allocation) that still satisfies the minimum/preferred throughput requirement. Or, if the current transmission power does not satisfy the minimum/preferred throughput requirement (e.g., because of a degradation in channel conditions), the additional transmission power needed to reach the minimum/preferred throughput. Then, the transmission power reduction (or increase) may be added (or subtracted) to the power used for the last transmission (e.g., in the allocation) to determine the minimum required transmission power for the next transmission.

The above translation may be described with the following equations, where [PwrHeadroomDB] is the calculated transmission power reduction that provides a minimum required throughput [MinReqTpt], given the expected (e.g., the estimated or last) throughput before splitting by the power headroom [LQCurrentExpectedTpT]:

$$Min\_TxP = LastUsed\_TxPower - PwrHeadroomDB$$

$$MinReqTpt =$$

$$LQCurrentExpectedTpT - PwrHeadroomDB * TvA\_Slope[Bw, Band] \rightarrow$$

$$PwrHeadroomDB =$$

$$(LQCurrentExpectedTpT - MinReqTpt) / TvA\_Slope[BW, Band]$$

Based on the determined minimum transmit power and/or preferred transmit power from each of the multiple communication systems, the transmission power manager 910 may then allocate a portion of the overall transmission power budget to each communication module. The overall transmission power budget may, for example, be based on the available transmission power that allows the user-device to stay within regulatory requirements for human exposure (e.g., SAR, PD, etc.). The transmission power manager 910 may allocate budget using, for example, a lookup table with rules for prioritizing the requests. For example, the prioritization may be based on a set of rules for the type/priority of communication system making the request, the type/priority of user data being transmitted on the requesting communication system, the current activity of the user on the user-device, etc., where the rules may be fixed or dynamically changed as actual conditions change in the wireless environments or of the activities of the user device (e.g., workload, task-focus, etc.).

For example, the transmission power manager 910 may have a rule that first allocates from the overall budget the minimum required transmission power requested by each communication system, and then, if additional budget is available, increase the allocation based on a priority assigned to each of the individual communication system, the user-entered preference of priority, and/or by a weighted distribution, etc.

Figure 10:
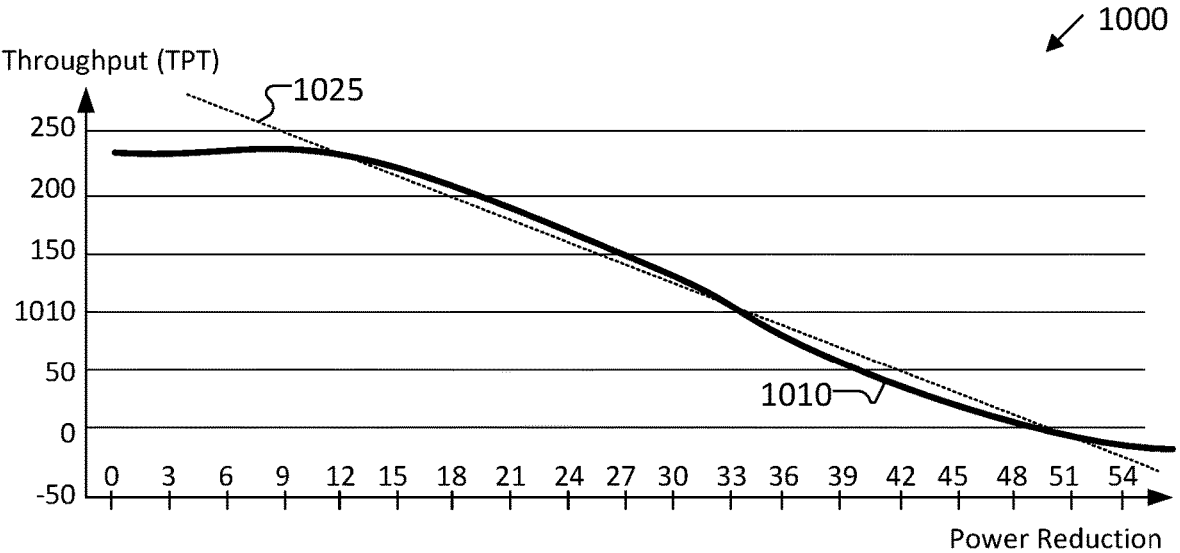
FIG. 10 shows an example graph of how a change in transmit power may correspond to a change in throughput and of a linear regression associated therewith.

FIG. 10 shows an example graph 1000 of the relationship between throughput (TPT) and power reduction. Graph 1000 plots throughput (on the Y-axis) as a function of power reduction (on the X-axis). Line 1025 depicts, for example, a predefined data primitive (e.g., that may be stored in a database in a memory) of a throughput-versus-attenuation [TvA] relationship for a given channel condition. Line 1010 shows a linear regression on the slope portion of the TvA of line 1025, which may be the slopes determined from the TvA as discussed above. As should be appreciated from the discussion above, a number of different primitives and slopes would exist for a number of different channel conditions such that a representative slope may be selected that most closely matches the current channel conditions.

Figure 11:
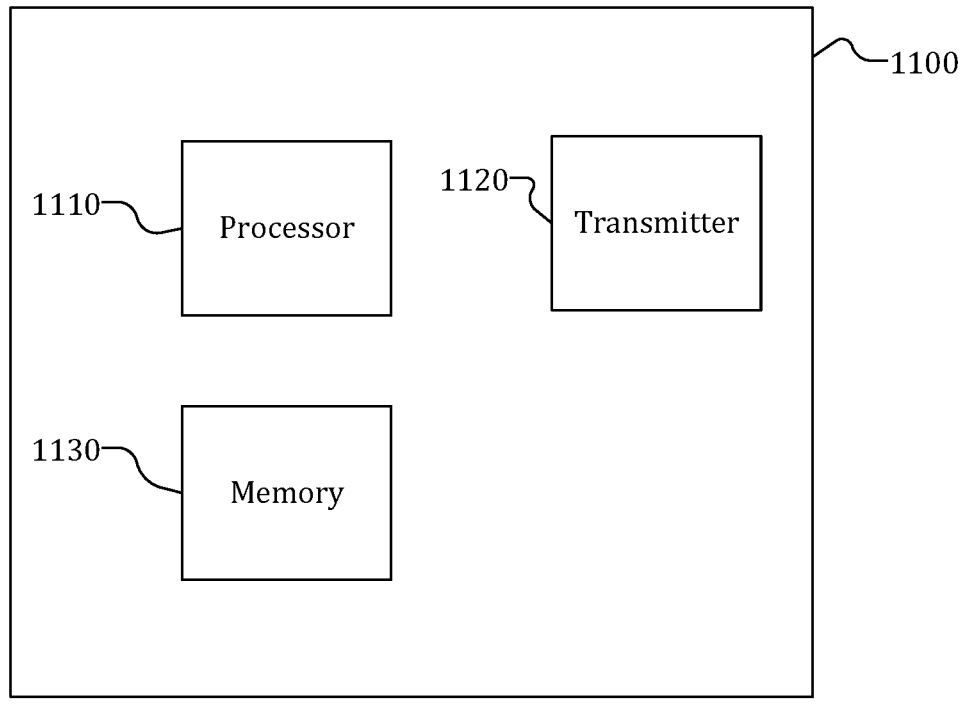
FIG. 11 illustrates an exemplary schematic drawing of a device for adjusting transmit properties based on compliance metrics for human exposure to radiation.

FIG. 11 shows an example of device 1100 for use in a smart adaption system for managing transmission power based on human exposure metrics. Without limitation, device 1100 may implement any of the features described above with respect to smart adaption systems and FIGS. 1-10). FIG. 11 may be implemented as a device, a system, a method, and/or a computer readable medium that, when executed, performs any of the features of the smart adaption system described above. It should be appreciated that device 1100 is merely exemplary, and this example is not intended to limit the above-described smart adaption system in any way.

Device 1100 includes a processor 1110 configured to determine a first transmission power limit associated with transmissions on a first radio resource, wherein the first transmission power limit is based on a first compliance level threshold of human exposure to emitted radiation when using the first radio resource. Processor 1110 is also configured to determine a second transmission power limit associated with transmissions on a second radio resource, wherein the second transmission power limit is based on a second compliance level threshold of human exposure to emitted radiation when transmitting using the second radio resource. Processor 1110 is also configured to control a wireless device to select either the first radio resource or the second radio resource for a transmission (e.g., via transmitter 1120) from the wireless device based on the first transmission power limit and the second transmission power limit. Furthermore, in addition to or in combination with any one of the features of this and/or the following paragraphs, the first transmission power limit and/or the second transmission power limit may be stored in a memory 1130.

Furthermore, in addition to or in combination with any one of the features of this and/or the preceding paragraph with respect to device 1100, processor 1110 may be configured to determine the first compliance level threshold or the second compliance level threshold based on a geographic location of device 1100. Furthermore, in addition to or in combination with any one of the features of this and/or the preceding paragraph, the first compliance level threshold or the second compliance level threshold may be based on a specific absorption rate (SAR) metric or a power density metric. Furthermore, in addition to or in combination with any one of the features of this and/or the preceding paragraph, the power density metric may include at least one of an absorbed power density (APD) metric and an incident power density (IPD) metric. Furthermore, in addition to or in combination with any one of the features of this and/or the preceding paragraph, the first radio resource may include a first transmission channel of the first radio resource and the second radio resource may include a second transmission channel of the second radio resource. Furthermore, in addition to or in combination with any one of the features of this and/or the preceding paragraph, the first transmission channel may be in a first frequency band that defines the first transmission power limit, wherein the second transmission channel may be in a second frequency band that defines the second transmission power limit. Furthermore, in addition to or in combination with any one of the features of this and/or the preceding paragraph, the first frequency band may be different from the second frequency band.

Furthermore, in addition to or in combination with any one of the features of this and/or the preceding two paragraphs with respect to device 1100, the first radio resource and the second radio resource may be a same type of radio access technology. Furthermore, in addition to or in combination with any one of the features of this and/or the preceding two paragraphs, the first radio resource and the second radio resource may be a different type of radio access technology. Furthermore, in addition to or in combination with any one of the features of this and/or the preceding two paragraphs, device 1100 may further include a transmitter 1120 of the wireless device that performs the transmission.

Figure 12:
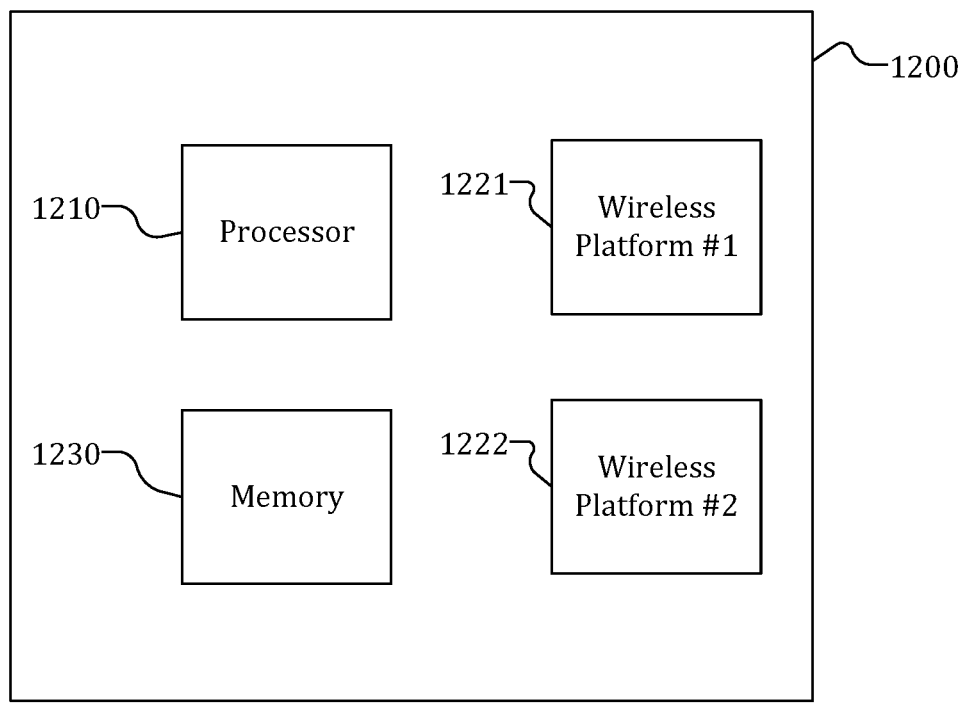
FIG. 12 illustrates an exemplary schematic drawing of a device for adjusting transmit properties based on compliance metrics for human exposure to radiation.

FIG. 12 shows an example of device 1200 for use in a smart adaption system for managing transmission power based on human exposure metrics. Without limitation, device 1200 may implement any of the features described above with respect to smart adaption systems and FIGS. 1-11). FIG. 12 may be implemented as a device, a system, a method, and/or a computer readable medium that, when executed, performs any of the features of the smart adaption system described above. It should be appreciated that device 1200 is merely exemplary, and this example is not intended to limit the above-described smart adaption system in any way.

Device 1200 includes a processor 1210 configured to determine an available transmission power at a transmission time based on a simultaneous transmission metric to be enforced during the transmission time, wherein the simultaneous transmission metric includes a compliance level threshold of human exposure to emitted radiation from a first wireless transmission platform 1221 (e.g., an antenna of a first wireless system) together with a second wireless transmission platform 1222 (e.g., an antenna of a second wireless system) of device 1200. Processor 1210 is also configured to determine an apportionment of the available transmission power between a first transmission power for the first wireless transmission platform 1221 and a second transmission power for the second wireless transmission platform 1222. Processor 1210 is also configured to control the first wireless transmission platform 1221 to transmit at the transmission time with the first transmission power and the second wireless transmission platform 1222 to transmit at the transmission time with the second transmission power.

Furthermore, in addition to or in combination with any one of the features of this and/or the preceding paragraph with respect to device 1200, the simultaneous transmission metric may include a specific absorption rate compliance level threshold, wherein the available transmission power is based on a time-averaged specific absorption rate with respect to the specific absorption rate compliance level threshold. Furthermore, in addition to or in combination with any one of the features of this and/or the preceding paragraph, the available transmission power may include an average transmission power over a predefined time period. Furthermore, in addition to or in combination with any one of the features of this and/or the preceding paragraph, the first wireless transmission platform 1221 may include a transmission antenna of a wireless module, wherein the second wireless transmission platform 1222 may include a second transmission antenna of a second wireless module that is different from the first wireless module. Furthermore, in addition to or in combination with any one of the features of this and/or the preceding paragraph, the simultaneous transmission metric may include a maximum permissive exposure for summed emissions of both the first wireless transmission platform 1221 and the second wireless transmission platform 1222.

Furthermore, in addition to or in combination with any one of the features of this and/or the preceding two paragraphs with respect to device 1200, the first transmit power level may be below a permitted transmit power for the first wireless transmission platform 1221, wherein the permitted transmit power may be based on a compliance level threshold of human exposure to emitted radiation from only the first wireless transmission platform 1221. Furthermore, in addition to or in combination with any one of the features of this and/or the preceding two paragraphs, the first transmit power level may be below a permitted transmit power for the first wireless transmission platform 1221, wherein the permitted transmit power may be based on a compliance level threshold of human exposure to emitted radiation from the first wireless transmission platform 1221 and a maximum permitted transmit power for the second wireless transmission platform 1222. Furthermore, in addition to or in combination with any one of the features of this and/or the preceding two paragraphs, processor 1210 configured to control the first wireless transmission platform 1221 to transmit with the first transmission power may include processor 1210 configured to send a first instruction to a first wireless module processor of the first wireless transmission platform 1221, wherein the first wireless module processor is different from the processor 1210, wherein processor 1210 configured to control the first wireless transmission platform 1221 to transmit with the first transmission power may also include processor 1210 configured to send a second instruction to a second wireless module processor of the second wireless transmission platform 1222, wherein the second wireless module processor is different from the processor 1210.

Furthermore, in addition to or in combination with any one of the features of this and/or the preceding three paragraphs, device 1200 may further include a first system-on-chip that may include the first wireless transmission platform 1221 and first wireless module processor and device 1200 may further include a second system-on-chip device that includes the second wireless transmission platform 1222 and second wireless module processor. Furthermore, in addition to or in combination with any one of the features of this and/or the preceding three paragraphs, processor 1210 may include a host processor for device 1200. Furthermore, in addition to or in combination with any one of the features of this and/or the preceding three paragraphs, the available transmission power may include an average transmission power over a predefined time period, wherein processor 1210 may be configured to determine the predefined time period based on a type of the first system-on-chip or of the second system-on-chip. Furthermore, in addition to or in combination with any one of the features of this and/or the preceding three paragraphs, the available transmission power may be based on an estimation of emitted radiation from the first wireless transmission platform 1221 and/or the second wireless transmission platform 1222.

Furthermore, in addition to or in combination with any one of the features of this and/or the preceding four paragraphs with respect to device 1200, the available transmission power may be based on a predefined margin (e.g., stored in memory 1230) for maintaining an individual compliance level threshold of human exposure to emitted radiation from the first wireless transmission platform 1221 or from the second wireless transmission platform 1222. Furthermore, in addition to or in combination with any one of the features of this and/or the preceding four paragraphs, the available transmission power may include an overall budget for a superposed equivalent isotropic radiated power from device 1200 at the transmission time. Furthermore, in addition to or in combination with any one of the features of this and/or the preceding four paragraphs, the apportionment may be based on a predefined criterion (e.g., stored in a memory) for an estimated transmission performance at the transmission time of the first wireless transmission platform 1221 and/or of the second wireless transmission platform 1222. Furthermore, in addition to or in combination with any one of the features of this and/or the preceding four paragraphs, the predefined criterion for the estimated transmission performance may include a minimum combined throughput of or a maximum latency of the first wireless transmission platform 1221 and/or of the second wireless transmission platform 1222.

Furthermore, in addition to or in combination with any one of the features of this and/or the preceding five paragraphs, processor 1210 may be further configured to determine the predefined criterion based on a channel condition of the first wireless transmission platform 1221 and/or of the second wireless transmission platform 1222. Furthermore, in addition to or in combination with any one of the features of this and/or the preceding five paragraphs, processor 1210 configured to determine the apportionment may include processor 1210 configured to translate the predefined criterion to the first transmission power and the second transmission power based on a current channel condition of the first wireless transmission platform 1221 and/or of the second wireless transmission platform 1222. Furthermore, in addition to or in combination with any one of the features of this and/or the preceding five paragraphs, processor 1210 configured to translate may include processor 1210 configured to select a predefined data primitive based on the channel condition.

Furthermore, in addition to or in combination with any one of the features of this and/or the preceding six paragraphs, the predefined data primitive may include a throughput-versus-attenuation relationship related to the channel condition. Furthermore, in addition to or in combination with any one of the features of this and/or the preceding six paragraphs, processor 1210 configured to translate may include processor 1210 configured to perform a linear regression on a slope portion of the throughput-versus-attenuation relationship. Furthermore, in addition to or in combination with any one of the features of this and/or the preceding six paragraphs, processor 1210 may be further configured to select the throughput-versus-attenuation relationship from a database (e.g., stored in a memory) of stored slopes associated with a rate condition and on a per-channel basis. Furthermore, in addition to or in combination with any one of the features of this and/or the preceding six paragraphs, the rate condition may include at least one of a bandwidth, a frequency channel, a frequency band, a fading condition, and a multipath condition. Furthermore, in addition to or in combination with any one of the features of this and/or the preceding six paragraphs, processor 1210 configured to translate may include processor 1210 configured to determine the channel condition and select one of the stored slopes as the throughput-versus-attenuation relationship from the database based on the channel condition.

Furthermore, in addition to or in combination with any one of the features of this and/or the preceding seven paragraphs, processor 1210 configured to translate may include processor 1210 configured to determine the attenuation based on a slope of the throughput-versus-attenuation relationship. Furthermore, in addition to or in combination with any one of the features of this and/or the preceding seven paragraphs, the throughput-versus-attenuation relationship may include a corresponding reduction in throughput for each unit of reduction in a level of the first transmission power or the second transmission power. Furthermore, in addition to or in combination with any one of the features of this and/or the preceding seven paragraphs, processor 1210 configured to translate the predefined criterion to the first transmission power and the second transmission power may include processor 1210 configured to calculate a power change to the first transmission power or the second transmission power based on a lowest power that maintains a required minimum throughput of the first or second wireless transmission platform after the power change. Furthermore, in addition to or in combination with any one of the features of this and/or the preceding seven paragraphs, the power change may include a power increase of the first transmission power or the second transmission power to the lowest power; or the power change may include a power decrease of the first transmission power and the second transmission power to the lowest power. Furthermore, in addition to or in combination with any one of the features of this and/or the preceding seven paragraphs, first wireless transmission platform 1221 may include a transmitter and an antenna of a wireless system, wherein the second wireless transmission platform 1222 may include a transmitter and an antenna of a second wireless system.

FIGS. 13-14 each depict a schematic flow diagram of a method (e.g., method 1300 and method 1400) for smart adaption of transmission powers based on human exposure metrics. Method 1300 and method 1400 may implement any of the features of the smart adaption system described above and with respect to FIGS. 1-11.

With respect to FIG. 13, method 1300 includes, in 1310, determining a first transmission power limit associated with transmissions on a first radio resource, wherein the first transmission power limit is based on a first compliance level threshold of human exposure to emitted radiation when using the first radio resource. The method 1300 also includes, in 1320, determining a second transmission power limit associated with transmissions on a second radio resource, wherein the second transmission power limit is based on a second compliance level threshold of human exposure to emitted radiation when transmitting using the second radio resource. The method 1300 also includes, in 1330, controlling a wireless device to select either the first radio resource or the second radio resource for a transmission from the wireless device based on the first transmission power limit and the second transmission power limit.

With respect to FIG. 14, method 1400 includes, in 1410, determining an available transmission power at a transmission time based on a simultaneous transmission metric to be enforced during the transmission time, wherein the simultaneous transmission metric includes a compliance level threshold of human exposure to emitted radiation from a first wireless transmission platform (e.g., an antenna of a wireless system) together with a second wireless transmission platform (e.g., an antenna of a second wireless system) of a wireless device. Method 1400 also includes, in 1420, determining an apportionment of the available transmission power between a first transmission power for the first wireless transmission platform and a second transmission power for the second wireless transmission platform. Method 1400 also includes, in 1430, controlling the first wireless transmission platform to transmit at the transmission time with the first transmission power and the second wireless transmission platform to transmit at the transmission time with the second transmission power In the following, various examples are provided that may include one or more features of the smart adaption system described above and with respect to FIGS. 1-14. The examples provided in relation to the devices may apply also to the described method(s), and vice versa.

Example 1 is a device including a processor configured to determine a first transmission power limit associated with transmissions on a first radio resource, wherein the first transmission power limit is based on a first compliance level threshold of human exposure to emitted radiation when using the first radio resource. The processor is also configured to determine a second transmission power limit associated with transmissions on a second radio resource, wherein the second transmission power limit is based on a second compliance level threshold of human exposure to emitted radiation when transmitting using the second radio resource. The processor is also configured to control a wireless device to select either the first radio resource or the second radio resource for a transmission from the wireless device based on the first transmission power limit and the second transmission power limit.

Example 2 is the device of example 1, wherein the processor is configured to determine the first compliance level threshold or the second compliance level threshold based on a geographic location of the device.

Example 3 is the device of either of examples 1 or 2, wherein the first compliance level threshold or the second compliance level threshold is based on a specific absorption rate (SAR) metric or a power density metric.

Example 4 is the device of any one of examples 1 to 3, wherein the power density metric includes at least one of an absorbed power density (APD) metric and an incident power density (IPD) metric.

Example 5 is the device of any one of examples 1 to 4, wherein the first radio resource includes a first transmission channel of the first radio resource and the second radio resource includes a second transmission channel of the second radio resource.

Example 6 is the device of example 5, wherein the first transmission channel is in a first frequency band that defines the first transmission power limit, wherein the second transmission channel is in a second frequency band that defines the second transmission power limit.

Example 7 is the device of example 6, wherein the first frequency band is different from the second frequency band.

Example 8 is the device of any one of examples 1 to 7, wherein the first radio resource and the second radio resource are a same type of radio access technology.

Example 9 is the device of any one of examples 1 to 8, wherein the first radio resource and the second radio resource are a different type of radio access technology.

Example 10 is the device of any one of examples 1 to 9, the device further including a transmitter of the wireless device that performs the transmission.

Example 11 is a device including a processor configured to determine an available transmission power at a transmission time based on a simultaneous transmission metric to be enforced during the transmission time, wherein the simultaneous transmission metric includes a compliance level threshold of human exposure to emitted radiation from a first wireless transmission platform (e.g., an antenna of a wireless system) together with a second wireless transmission platform (e.g., an antenna of a second wireless system) of the device. The processor is also configured to determine an apportionment of the available transmission power between a first transmission power for the first wireless transmission platform and a second transmission power for the second wireless transmission platform. The processor is also configured to control the first wireless transmission platform to transmit at the transmission time with the first transmission power and the second wireless transmission platform to transmit at the transmission time with the second transmission power.

Example 12 is the device of example 11, wherein the simultaneous transmission metric includes a specific absorption rate compliance level threshold, wherein the available transmission power is based on a time-averaged specific absorption rate with respect to the specific absorption rate compliance level threshold.

Example 13 is the device of either one of examples 11 or 12, wherein the available transmission power includes an average transmission power over a predefined time period.

Example 14 is the device of any one of examples 11 to 13, wherein the first wireless transmission platform includes a transmission antenna of a wireless module, wherein the second wireless transmission platform includes a second transmission antenna of a second wireless module that is different from the first wireless module.

Example 15 is the device of any one of examples 11 to 14, wherein the simultaneous transmission metric includes a maximum permissive exposure for summed emissions of both the first wireless transmission platform and the second wireless transmission platform.

Example 16 is the device of any one of examples 11 to 15, wherein the first transmit power level is below a permitted transmit power for the first wireless transmission platform, wherein the permitted transmit power is based on a compliance level threshold of human exposure to emitted radiation from only the first wireless transmission platform.

Example 17 is the device of any one of examples 11 to 16, wherein the first transmit power level is below a permitted transmit power for the first wireless transmission platform, wherein the permitted transmit power is based on a compliance level threshold of human exposure to emitted radiation from the first wireless transmission platform and a maximum permitted transmit power for the second wireless transmission platform.

Example 18 is the device of any one of examples 11 to 17, wherein the processor configured to control the first wireless transmission platform to transmit with the first transmission power includes the processor configured to send a first instruction to a first wireless module processor of the first wireless transmission platform, wherein the first wireless module processor is different from the processor. It also includes the processor configured to send a second instruction to a second wireless module processor of the second wireless transmission platform, wherein the second wireless module processor is different from the processor.

Example 19 is the device of example 18, wherein the device further includes a first system-on-chip including the first wireless transmission platform and first wireless module processor. The device also includes a second system-on-chip device including the second wireless transmission platform and second wireless module processor.

Example 20 is the device of either one of examples 18 or 19, wherein the processor includes a host processor for the device.

Example 21 is the device of either one of examples 19 or 20, wherein the available transmission power includes an average transmission power over a predefined time period, wherein the processor is configured to determine the predefined time period based on a type of the first system-on-chip or of the second system-on-chip.

Example 22 is the device of any one of examples 11 to 21, wherein the available transmission power is based on an estimation of emitted radiation from the first wireless transmission platform and/or the second wireless transmission platform.

Example 23 is the device of any one of examples 11 to 22, wherein the available transmission power is based on a predefined margin (e.g., stored in a memory) for maintaining an individual compliance level threshold of human exposure to emitted radiation from the first wireless transmission platform or from the second wireless transmission platform.

Example 24 is the device of any one of examples 11 to 23, wherein the available transmission power includes an overall budget for a superposed equivalent isotropic radiated power from the device at the transmission time.

Example 25 is the device of any one of examples 11 to 24, wherein the apportionment is based on a predefined criterion (e.g., stored in a memory) for an estimated transmission performance at the transmission time of the first wireless transmission platform and/or of the second wireless transmission platform.

Example 26 is the device of example 25, wherein the predefined criterion for the estimated transmission performance includes a minimum combined throughput of or a maximum latency of the first wireless transmission platform and/or of the second wireless transmission platform.

Example 27 is the device of either of examples 25 or 26, wherein the processor is further configured to determine the predefined criterion based on a current channel condition of the first wireless transmission platform and/or of the second wireless transmission platform.

Example 28 is the device of any one of examples 25 to 27, wherein the processor configured to determine the apportionment includes the processor configured to translate the predefined criterion to the first transmission power and the second transmission power based on a current channel condition of the first wireless transmission platform and/or of the second wireless transmission platform.

Example 29 is the device of example 28, wherein the processor configured to translate includes the processor configured to select a predefined data primitive based on the current channel condition.

Example 30 is the device of example 29, wherein the predefined data primitive includes a throughput-versus-attenuation relationship related to the current channel condition.

Example 31 is the device of example 30, wherein the processor configured to translate includes the processor configured to perform a linear regression on a slope portion of the throughput-versus-attenuation relationship.

Example 32 is the device of example 31, wherein the processor is further configured to select the throughput-versus-attenuation relationship from a database (e.g., stored in a memory) of stored slopes associated with a rate condition and on a per-channel basis.

Example 33 is the device of example 32, wherein the rate condition includes at least one of a bandwidth, a frequency channel, a frequency band, a fading condition, and a multipath condition.

Example 34 is the device of either one of examples 32 or 33, wherein the processor configured to translate includes the processor configured to determine the current channel condition and select one of the stored slopes as the throughput-versus-attenuation relationship from the database based on the current channel condition.

Example 35 is the device of any one of examples 30 to 34, the processor configured to translate includes the processor configured to determine the attenuation based on a slope of the throughput-versus-attenuation relationship.

Example 36 is the device of any one of examples 30 to 35, wherein the throughput-versus-attenuation relationship includes a corresponding reduction in throughput for each unit of reduction in a level of the first transmission power or the second transmission power.

Example 37 is the device of any one of examples 28 to 36, wherein the processor configured to translate the predefined criterion to the first transmission power and the second transmission power includes the processor configured to calculate a power change to the first transmission power or the second transmission power based on a lowest power that maintains a required minimum throughput of the first or second wireless transmission platform after the power change.

Example 38 is the device of example 37, wherein the power change includes a power increase of the first transmission power or the second transmission power to the lowest power. Or the power change may include a power decrease of the first transmission power and the second transmission power to the lowest power.

Example 39 is the device of any one of examples 11 to 38, wherein the first wireless transmission platform includes a transmitter and an antenna of a wireless system, wherein the second wireless transmission platform includes a transmitter and an antenna of a second wireless system.

Example 40 is a method including determining a first transmission power limit associated with transmissions on a first radio resource, wherein the first transmission power limit is based on a first compliance level threshold of human exposure to emitted radiation when using the first radio resource. The method also includes determining a second transmission power limit associated with transmissions on a second radio resource, wherein the second transmission power limit is based on a second compliance level threshold of human exposure to emitted radiation when transmitting using the second radio resource. The method also includes controlling a wireless device to select either the first radio resource or the second radio resource for a transmission from the wireless device based on the first transmission power limit and the second transmission power limit.

Example 41 is the method of example 40, wherein the method includes determining the first compliance level threshold or the second compliance level threshold based on a geographic location.

Example 42 is the method of either of examples 40 or 41, wherein the first compliance level threshold or the second compliance level threshold is based on a specific absorption rate (SAR) metric or a power density metric.

Example 43 is the method of any one of examples 40 to 42, wherein the power density metric includes at least one of an absorbed power density (APD) metric and an incident power density (IPD) metric.

Example 44 is the method of any one of examples 40 to 43, wherein the first radio resource includes a first transmission channel of the first radio resource and the second radio resource includes a second transmission channel of the second radio resource.

Example 45 is the method of example 44, wherein the first transmission channel is in a first frequency band that defines the first transmission power limit, wherein the second transmission channel is in a second frequency band that defines the second transmission power limit.

Example 46 is the method of example 45, wherein the first frequency band is different from the second frequency band.

Example 47 is the method of any one of examples 40 to 46, wherein the first radio resource and the second radio resource are a same type of radio access technology.

Example 48 is the method of any one of examples 40 to 47, wherein the first radio resource and the second radio resource are a different type of radio access technology.

Example 49 is the method of any one of examples 40 to 48, the method further including transmitting (e.g. via a transmitter of the wireless device) the transmission.

Example 50 is a method including determining an available transmission power at a transmission time based on a simultaneous transmission metric to be enforced during the transmission time, wherein the simultaneous transmission metric includes a compliance level threshold of human exposure to emitted radiation from a first wireless transmission platform (e.g., an antenna of a wireless system) together with a second wireless transmission platform (e.g., an antenna of a second wireless system) of a wireless device. The method also includes determining an apportionment of the available transmission power between a first transmission power for the first wireless transmission platform and a second transmission power for the second wireless transmission platform. The method also includes controlling the first wireless transmission platform to transmit at the transmission time with the first transmission power and the second wireless transmission platform to transmit at the transmission time with the second transmission power.

Example 51 is the method of example 50, wherein the simultaneous transmission metric includes a specific absorption rate compliance level threshold, wherein the available transmission power is based on a time-averaged specific absorption rate with respect to the specific absorption rate compliance level threshold.

Example 52 is the method of either one of examples 50 or 51, wherein the available transmission power includes an average transmission power over a predefined time period.

Example 53 is the method of any one of examples 50 to 52, wherein the first wireless transmission platform includes a transmission antenna of a wireless module, wherein the second wireless transmission platform includes a second transmission antenna of a second wireless module that is different from the first wireless module.

Example 54 is the method of any one of examples 50 to 53, wherein the simultaneous transmission metric includes a maximum permissive exposure for summed emissions of both the first wireless transmission platform and the second wireless transmission platform.

Example 55 is the method of any one of examples 50 to 54, wherein the first transmit power level is below a permitted transmit power for the first wireless transmission platform, wherein the permitted transmit power is based on a compliance level threshold of human exposure to emitted radiation from only the first wireless transmission platform.

Example 56 is the method of any one of examples 50 to 55, wherein the first transmit power level is below a permitted transmit power for the first wireless transmission platform, wherein the permitted transmit power is based on a compliance level threshold of human exposure to emitted radiation from the first wireless transmission platform and a maximum permitted transmit power for the second wireless transmission platform.

Example 57 is the method of any one of examples 50 to 56, wherein controlling the first wireless transmission platform to transmit with the first transmission power includes sending a first instruction to a first wireless module processor of the first wireless transmission platform, wherein the first wireless module processor is different from the processor. It also includes sending a second instruction to a second wireless module processor of the second wireless transmission platform, wherein the second wireless module processor is different from the processor.

Example 58 is the method of example 57, wherein sending the first instruction to the first wireless module processor includes sending the first instruction to a first system-on-that includes the first wireless transmission platform and the first wireless module processor, wherein sending the second instruction to the wireless module processor includes sending the second instruction to a second system-on-chip device that includes the second wireless transmission platform and second wireless module processor.

Example 59 is the method of example 58, wherein the available transmission power includes an average transmission power over a predefined time period, wherein the method further includes determining the predefined time period based on a type of the first system-on-chip or of the second system-on-chip.

Example 60 is the method of any one of examples 50 to 59, wherein the available transmission power is based on an estimation of emitted radiation from the first wireless transmission platform and/or the second wireless transmission platform.

Example 61 is the method of any one of examples 50 to 60, wherein the available transmission power is based on a predefined margin (e.g., stored in a memory) for maintaining an individual compliance level threshold of human exposure to emitted radiation from the first wireless transmission platform or from the second wireless transmission platform.

Example 62 is the method of any one of examples 50 to 61, wherein the available transmission power includes an overall budget for a superposed equivalent isotropic radiated power from the wireless device at the transmission time.

Example 63 is the method of any one of examples 50 to 62, wherein the apportionment is based on a predefined criterion (e.g., stored in a memory) for an estimated transmission performance at the transmission time of the first wireless transmission platform and/or of the second wireless transmission platform.

Example 64 is the method of example 63, wherein the predefined criterion for the estimated transmission performance includes a minimum combined throughput of or a maximum latency of the first wireless transmission platform and/or of the second wireless transmission platform.

Example 65 is the method of either of examples 63 or 64, wherein the method further includes determining the predefined criterion based on a current channel condition of the first wireless transmission platform and/or of the second wireless transmission platform.

Example 66 is the method of any one of examples 63 to 65, wherein determining the apportionment includes translating the predefined criterion to the first transmission power and the second transmission power based on a current channel condition of the first wireless transmission platform and/or of the second wireless transmission platform.

Example 67 is the method of example 66, wherein the translating includes selecting a predefined data primitive based on the current channel condition.

Example 68 is the method of example 67, wherein the predefined data primitive includes a throughput-versus-attenuation relationship related to the current channel condition.

Example 69 is the method of example 68, wherein the translating includes the performing a linear regression on a slope portion of the throughput-versus-attenuation relationship.

Example 70 is the method of example 69, wherein the method further includes selecting the throughput-versus-attenuation relationship from a database (e.g., stored in a memory) of stored slopes associated with a rate condition and on a per-channel basis.

Example 71 is the method of example 70, wherein the rate condition includes at least one of a bandwidth, a frequency channel, a frequency band, a fading condition, and a multipath condition.

Example 72 is the method of either one of examples 70 or 71, wherein the translating includes determining the current channel condition and select one of the stored slopes as the throughput-versus-attenuation relationship from the database based on the current channel condition.

Example 73 is the method of any one of examples 68 to 72, the translating includes determining the attenuation based on a slope of the throughput-versus-attenuation relationship.

Example 74 is the method of any one of examples 68 to 73, wherein the throughput-versus-attenuation relationship includes a corresponding reduction in throughput for each unit of reduction in a level of the first transmission power or the second transmission power.

Example 75 is the method of any one of examples 66 to 74, wherein the translating the predefined criterion to the first transmission power and the second transmission power includes calculating a power change to the first transmission power or the second transmission power based on a lowest power that maintains a required minimum throughput of the first or second wireless transmission platform after the power change.

Example 76 is the method of example 75, wherein the power change includes a power increase of the first transmission power or the second transmission power to the lowest power. Or the power change may include a power decrease of the first transmission power and the second transmission power to the lowest power.

Example 77 is the method of any one of examples 50 to 76, wherein the first wireless transmission platform includes a transmitter and an antenna of a wireless system, wherein the second wireless transmission platform includes a transmitter and an antenna of a second wireless system.

Example 78 is a non-transitory computer readable medium that includes instructions, which if executed, cause one or more processors to determine a first transmission power limit associated with transmissions on a first radio resource, wherein the first transmission power limit is based on a first compliance level threshold of human exposure to emitted radiation when using the first radio resource. The instructions also cause the one or more processors to determine a second transmission power limit associated with transmissions on a second radio resource, wherein the second transmission power limit is based on a second compliance level threshold of human exposure to emitted radiation when transmitting using the second radio resource. The instructions also cause the one or more processors to control a wireless device to select either the first radio resource or the second radio resource for a transmission from the wireless device based on the first transmission power limit and the second transmission power limit.

Example 79 is the non-transitory computer readable medium of example 78, wherein the instructions also cause the one or more processors to determine the first compliance level threshold or the second compliance level threshold based on a geographic location of the wireless device.

Example 80 is the non-transitory computer readable medium of either of examples 78 or 79, wherein the first compliance level threshold or the second compliance level threshold is based on a specific absorption rate (SAR) metric or a power density metric.

Example 81 is the non-transitory computer readable medium of any one of examples 78 to 80, wherein the power density metric includes at least one of an absorbed power density (APD) metric and an incident power density (IPD) metric.

Example 82 is the non-transitory computer readable medium of any one of examples 78 to 81, wherein the first radio resource includes a first transmission channel of the first radio resource and the second radio resource includes a second transmission channel of the second radio resource.

Example 83 is the non-transitory computer readable medium of example 82, wherein the first transmission channel is in a first frequency band that defines the first transmission power limit, wherein the second transmission channel is in a second frequency band that defines the second transmission power limit.

Example 84 is the non-transitory computer readable medium of example 83, wherein the first frequency band is different from the second frequency band.

Example 85 is the non-transitory computer readable medium of any one of examples 78 to 84, wherein the first radio resource and the second radio resource are a same type of radio access technology.

Example 86 is the non-transitory computer readable medium of any one of examples 78 to 85, wherein the first radio resource and the second radio resource are a different type of radio access technology.

Example 87 is the non-transitory computer readable medium of any one of examples 78 to 86, the instructions further cause the one or more processors to perform the transmission via a transmitter of the wireless device.

Example 88 is a non-transitory computer readable medium including instructions, which if executed, cause one or more processors to determine an available transmission power at a transmission time based on a simultaneous transmission metric to be enforced during the transmission time, wherein the simultaneous transmission metric includes a compliance level threshold of human exposure to emitted radiation from a first wireless transmission platform (e.g., an antenna of a wireless system) together with a second wireless transmission platform (e.g., an antenna of a second wireless system) of a wireless device. The instructions also cause the one or more processors to determine an apportionment of the available transmission power between a first transmission power for the first wireless transmission platform and a second transmission power for the second wireless transmission platform. The instructions also cause the one or more processors to control the first wireless transmission platform to transmit at the transmission time with the first transmission power and the second wireless transmission platform to transmit at the transmission time with the second transmission power.

Example 89 is the non-transitory computer readable medium of example 88, wherein the simultaneous transmission metric includes a specific absorption rate compliance level threshold, wherein the available transmission power is based on a time-averaged specific absorption rate with respect to the specific absorption rate compliance level threshold.

Example 90 is the non-transitory computer readable medium of either one of examples 88 or 89, wherein the available transmission power includes an average transmission power over a predefined time period.

Example 91 is the non-transitory computer readable medium of any one of examples 88 to 90, wherein the first wireless transmission platform includes a transmission antenna of a wireless module, wherein the second wireless transmission platform includes a second transmission antenna of a second wireless module that is different from the first wireless module.

Example 92 is the non-transitory computer readable medium of any one of examples 88 to 91, wherein the simultaneous transmission metric includes a maximum permissive exposure for summed emissions of both the first wireless transmission platform and the second wireless transmission platform.

Example 93 is the non-transitory computer readable medium of any one of examples 88 to 92, wherein the first transmit power level is below a permitted transmit power for the first wireless transmission platform, wherein the permitted transmit power is based on a compliance level threshold of human exposure to emitted radiation from only the first wireless transmission platform.

Example 94 is the non-transitory computer readable medium of any one of examples 88 to 93, wherein the first transmit power level is below a permitted transmit power for the first wireless transmission platform, wherein the permitted transmit power is based on a compliance level threshold of human exposure to emitted radiation from the first wireless transmission platform and a maximum permitted transmit power for the second wireless transmission platform.

Example 95 is the non-transitory computer readable medium of any one of examples 88 to 94, wherein the instructions that cause the one or more processors to control the first wireless transmission platform to transmit with the first transmission power includes that the instructions cause the one or more processors to send a first instruction to a first wireless module processor of the first wireless transmission platform, wherein the first wireless module processor is different from the processor. It also includes that the instructions also cause the one or more processors to send a second instruction to a second wireless module processor of the second wireless transmission platform, wherein the second wireless module processor is different from the processor.

Example 96 is the non-transitory computer readable medium of example 95, wherein the non-transitory computer readable medium further includes a first system-on-chip including the first wireless transmission platform and first wireless module processor. The non-transitory computer readable medium also includes a second system-on-chip device including the second wireless transmission platform and second wireless module processor.

Example 97 is the non-transitory computer readable medium of either one of examples 95 or 96, wherein the one or more processors includes a host processor for the wireless device.

Example 98 is the non-transitory computer readable medium of either one of examples 96 or 97, wherein the available transmission power includes an average transmission power over a predefined time period, wherein the instructions further cause the one or more processors to determine the predefined time period based on a type of the first system-on-chip or of the second system-on-chip.

Example 99 is the non-transitory computer readable medium of any one of examples 88 to 98, wherein the available transmission power is based on an estimation of emitted radiation from the first wireless transmission platform and/or the second wireless transmission platform.

Example 100 is the non-transitory computer readable medium of any one of examples 88 to 99, wherein the available transmission power is based on a predefined margin (e.g., stored in a memory) for maintaining an individual compliance level threshold of human exposure to emitted radiation from the first wireless transmission platform or from the second wireless transmission platform.

Example 101 is the non-transitory computer readable medium of any one of examples 88 to 100, wherein the available transmission power includes an overall budget for a superposed equivalent isotropic radiated power from the wireless device at the transmission time.

Example 102 is the non-transitory computer readable medium of any one of examples 88 to 101, wherein the apportionment is based on a predefined criterion (e.g., stored in a memory) for an estimated transmission performance at the transmission time of the first wireless transmission platform and/or of the second wireless transmission platform.

Example 103 is the non-transitory computer readable medium of example 102, wherein the predefined criterion for the estimated transmission performance includes a minimum combined throughput of or a maximum latency of the first wireless transmission platform and/or of the second wireless transmission platform.

Example 104 is the non-transitory computer readable medium of either of examples 102 or 103, wherein the instructions further cause the one or more processors to determine the predefined criterion based on a current channel condition of the first wireless transmission platform and/or of the second wireless transmission platform.

Example 105 is the non-transitory computer readable medium of any one of examples 102 to 104, wherein the instructions that cause the one or more processors to determine the apportionment includes that the instructions cause the one or more processors to translate the predefined criterion to the first transmission power and the second transmission power based on a current channel condition of the first wireless transmission platform and/or of the second wireless transmission platform.

Example 106 is the non-transitory computer readable medium of example 105, wherein the instructions that cause the one or more processors to translate includes that the instructions cause the one or more processors to select a predefined data primitive based on the current channel condition.

Example 107 is the non-transitory computer readable medium of example 106, wherein the predefined data primitive includes a throughput-versus-attenuation relationship related to the current channel condition.

Example 108 is the non-transitory computer readable medium of example 107, wherein the instructions that cause the one or more processors to translate includes that the instructions also cause the one or more processors to perform a linear regression on a slope portion of the throughput-versus-attenuation relationship.

Example 109 is the non-transitory computer readable medium of example 108, wherein the instructions further cause the one or more processors to select the throughput-versus-attenuation relationship from a database (e.g., stored in a memory) of stored slopes associated with a rate condition and on a per-channel basis.

Example 110 is the non-transitory computer readable medium of example 109, wherein the rate condition includes at least one of a bandwidth, a frequency channel, a frequency band, a fading condition, and a multipath condition.

Example 111 is the non-transitory computer readable medium of either one of examples 109 or 110, wherein the instructions that cause the one or more processors to translate includes that the instructions also cause the one or more processors to determine the current channel condition and select one of the stored slopes as the throughput-versus-attenuation relationship from the database based on the current channel condition.

Example 112 is the non-transitory computer readable medium of any one of examples 107 to 111, wherein the instructions that cause the one or more processors to translate includes that the instructions also cause the one or more processors to determine the attenuation based on a slope of the throughput-versus-attenuation relationship.

Example 113 is the non-transitory computer readable medium of any one of examples 107 to 112, wherein the throughput-versus-attenuation relationship includes a corresponding reduction in throughput for each unit of reduction in a level of the first transmission power or the second transmission power.

Example 114 is the non-transitory computer readable medium of any one of examples 105 to 113, wherein the instructions that cause the one or more processors to translate the predefined criterion to the first transmission power and the second transmission power includes that the instructions cause the one or more processors to calculate a power change to the first transmission power or the second transmission power based on a lowest power that maintains a required minimum throughput of the first or second wireless transmission platform after the power change.

Example 115 is the non-transitory computer readable medium of example 114, wherein the power change includes a power increase of the first transmission power or the second transmission power to the lowest power. Or the power change may include a power decrease of the first transmission power and the second transmission power to the lowest power.

Example 116 is the non-transitory computer readable medium of any one of examples 88 to 115, wherein the first wireless transmission platform includes a transmitter and an antenna of a wireless system, wherein the second wireless transmission platform includes a transmitter and an antenna of a second wireless system.

Example 117 is a device including a means for determining a first transmission power limit associated with transmissions on a first radio resource, wherein the first transmission power limit is based on a first compliance level threshold of human exposure to emitted radiation when using the first radio resource. The device also includes a means for determining a second transmission power limit associated with transmissions on a second radio resource, wherein the second transmission power limit is based on a second compliance level threshold of human exposure to emitted radiation when transmitting using the second radio resource. The device also includes a means for controlling a wireless device to select either the first radio resource or the second radio resource for a transmission from the wireless device based on the first transmission power limit and the second transmission power limit.

Example 118 is the device of example 117, the device further including a means for determining the first compliance level threshold or the second compliance level threshold based on a geographic location of the device.

Example 119 is the device of either of examples 117 or 118, wherein the first compliance level threshold or the second compliance level threshold is based on a specific absorption rate (SAR) metric or a power density metric.

Example 120 is the device of any one of examples 117 to 119, wherein the power density metric includes at least one of an absorbed power density (APD) metric and an incident power density (IPD) metric.

Example 121 is the device of any one of examples 117 to 120, wherein the first radio resource includes a first transmission channel of the first radio resource and the second radio resource includes a second transmission channel of the second radio resource.

Example 122 is the device of example 121, wherein the first transmission channel is in a first frequency band that defines the first transmission power limit, wherein the second transmission channel is in a second frequency band that defines the second transmission power limit.

Example 123 is the device of example 122, wherein the first frequency band is different from the second frequency band.

Example 124 is the device of any one of examples 117 to 123, wherein the first radio resource and the second radio resource are a same type of radio access technology.

Example 125 is the device of any one of examples 117 to 124, wherein the first radio resource and the second radio resource are a different type of radio access technology.

Example 126 is the device of any one of examples 117 to 125, the device further including a means for transmitting (e.g., a transmitting means (e.g., a transmitter)) the transmission from the device.

Example 127 is a device including a means for determining an available transmission power at a transmission time based on a simultaneous transmission metric to be enforced during the transmission time, wherein the simultaneous transmission metric includes a compliance level threshold of human exposure to emitted radiation from a first wireless transmission platform (e.g., an antenna of a wireless system) together with a second wireless transmission platform (e.g., an antenna of a second wireless system) of the device. The device also includes a means for determining an apportionment of the available transmission power between a first transmission power for the first wireless transmission platform and a second transmission power for the second wireless transmission platform. The device also includes a means for controlling the first wireless transmission platform to transmit at the transmission time with the first transmission power and the second wireless transmission platform to transmit at the transmission time with the second transmission power.

Example 128 is the device of example 127, wherein the simultaneous transmission metric includes a specific absorption rate compliance level threshold, wherein the available transmission power is based on a time-averaged specific absorption rate with respect to the specific absorption rate compliance level threshold.

Example 129 is the device of either one of examples 127 or 128, wherein the available transmission power includes an average transmission power over a predefined time period.

Example 130 is the device of any one of examples 127 to 129, wherein the first wireless transmission platform includes a transmission antenna of a wireless module, wherein the second wireless transmission platform includes a second transmission antenna of a second wireless module that is different from the first wireless module.

Example 131 is the device of any one of examples 127 to 130, wherein the simultaneous transmission metric includes a maximum permissive exposure for summed emissions of both the first wireless transmission platform and the second wireless transmission platform.

Example 132 is the device of any one of examples 127 to 131, wherein the first transmit power level is below a permitted transmit power for the first wireless transmission platform, wherein the permitted transmit power is based on a compliance level threshold of human exposure to emitted radiation from only the first wireless transmission platform.

Example 133 is the device of any one of examples 127 to 132, wherein the first transmit power level is below a permitted transmit power for the first wireless transmission platform, wherein the permitted transmit power is based on a compliance level threshold of human exposure to emitted radiation from the first wireless transmission platform and a maximum permitted transmit power for the second wireless transmission platform.

Example 134 is the device of any one of examples 127 to 133, wherein the means for controlling the first wireless transmission platform to transmit with the first transmission power includes a means for sending a first instruction to a first wireless module processor of the first wireless transmission platform, wherein the first wireless module processor is different from the processor. It also includes a means for sending a second instruction to a second wireless module processor of the second wireless transmission platform, wherein the second wireless module processor is different from a processor of the device.

Example 135 is the device of example 134, wherein the device further includes a first system-on-chip including the first wireless transmission platform and first wireless module processor. The device also includes a second system-on-chip device including the second wireless transmission platform and second wireless module processor.

Example 136 is the device of either one of examples 134 or 135, wherein the processor includes a host processor for the device.

Example 137 is the device of either one of examples 135 or 136, wherein the available transmission power includes an average transmission power over a predefined time period, wherein the device further includes a means for determining the predefined time period based on a type of the first system-on-chip or of the second system-on-chip.

Example 138 is the device of any one of examples 127 to 137, wherein the available transmission power is based on an estimation of emitted radiation from the first wireless transmission platform and/or the second wireless transmission platform.

Example 139 is the device of any one of examples 127 to 138, wherein the available transmission power is based on a predefined margin (e.g., stored in a storage means (e.g., a memory)) for maintaining an individual compliance level threshold of human exposure to emitted radiation from the first wireless transmission platform or from the second wireless transmission platform.

Example 140 is the device of any one of examples 127 to 139, wherein the available transmission power includes an overall budget for a superposed equivalent isotropic radiated power from the device at the transmission time.

Example 141 is the device of any one of examples 127 to 140, wherein the apportionment is based on a predefined criterion (e.g., stored in a storage means (e.g., a memory)) for an estimated transmission performance at the transmission time of the first wireless transmission platform and/or of the second wireless transmission platform.

Example 142 is the device of example 141, wherein the predefined criterion for the estimated transmission performance includes a minimum combined throughput of or a maximum latency of the first wireless transmission platform and/or of the second wireless transmission platform.

Example 143 is the device of either of examples 141 or 142, wherein the device further includes a means for determining the predefined criterion based on a current channel condition of the first wireless transmission platform and/or of the second wireless transmission platform.

Example 144 is the device of any one of examples 141 to 143, wherein the means for determining the apportionment includes a means for translating the predefined criterion to the first transmission power and the second transmission power based on a current channel condition of the first wireless transmission platform and/or of the second wireless transmission platform.

Example 145 is the device of example 144, wherein the means for translating includes a means for selecting a predefined data primitive based on the current channel condition.

Example 146 is the device of example 145, wherein the predefined data primitive includes a throughput-versus-attenuation relationship related to the current channel condition.

Example 147 is the device of example 146, wherein the means for translating includes a means for performing a linear regression on a slope portion of the throughput-versus-attenuation relationship.

Example 148 is the device of example 147, the device further including a means for selecting the throughput-versus-attenuation relationship from a database (e.g., stored in a storage means (e.g., a memory)) of stored slopes associated with a rate condition and on a per-channel basis.

Example 149 is the device of example 148, wherein the rate condition includes at least one of a bandwidth, a frequency channel, a frequency band, a fading condition, and a multipath condition.

Example 150 is the device of either one of examples 148 or 149, wherein the means for translating includes a means for determining the current channel condition and select one of the stored slopes as the throughput-versus-attenuation relationship from the database based on the current channel condition.

Example 151 is the device of any one of examples 146 to 150, the means for translating includes a means for determining the attenuation based on a slope of the throughput-versus-attenuation relationship.

Example 152 is the device of any one of examples 146 to 151, wherein the throughput-versus-attenuation relationship includes a corresponding reduction in throughput for each unit of reduction in a level of the first transmission power or the second transmission power.

Example 153 is the device of any one of examples 144 to 152, wherein the means for translating the predefined criterion to the first transmission power and the second transmission power includes a means for calculating a power change to the first transmission power or the second transmission power based on a lowest power that maintains a required minimum throughput of the first or second wireless transmission platform after the power change.

Example 154 is the device of example 153, wherein the power change includes a power increase of the first transmission power or the second transmission power to the lowest power. Or the power change may include a power decrease of the first transmission power and the second transmission power to the lowest power.

Example 155 is the device of any one of examples 127 to 154, wherein the first wireless transmission platform includes a transmitting means and an antenna means of a wireless system, wherein the second wireless transmission platform includes a transmitting means and an antenna means of a second wireless system.

While the disclosure has been particularly shown and described with reference to specific aspects, it should be understood by those skilled in the art that various changes in form and detail may be made therein without departing from the spirit and scope of the disclosure as defined by the appended claims. The scope of the disclosure is thus indicated by the appended claims and all changes, which come within the meaning and range of equivalency of the claims, are therefore intended to be embraced.

The invention claimed is:

1. A device comprising a processor configured to:
   determine an available transmission power at a transmission time based on a simultaneous transmission metric to be enforced during the transmission time, wherein the simultaneous transmission metric comprises a compliance level threshold of human exposure to emitted radiation from a first wireless transmission platform together with a second wireless transmission platform of the device;

determine an apportionment of the available transmission power between a first transmission power for the first wireless transmission platform and a second transmission power for the second wireless transmission platform, wherein the apportionment is based on a predefined criterion for an estimated transmission performance at the transmission time of the first wireless transmission platform or of the second wireless transmission platform;

translate the predefined criterion to the first transmission power and the second transmission power based on a current channel condition of the first wireless transmission platform or of the second wireless transmission platform;

select, based on the current channel condition, a throughput-versus-attenuation relationship from a database of predefined throughput-versus-attenuation relationships; and control the first wireless transmission platform to transmit at the transmission time with the first transmission power and the second wireless transmission platform to transmit at the transmission time with the second transmission power.

2. The device of claim 1, wherein the simultaneous transmission metric comprises a specific absorption rate compliance level threshold, wherein the available transmission power is based on a time-averaged specific absorption rate with respect to the specific absorption rate compliance level threshold.

3. The device of claim 1, wherein the available transmission power comprises an average transmission power over a predefined time period.

4. The device of claim 1, wherein the first wireless transmission platform comprises a transmission antenna of a wireless module, wherein the second wireless transmission platform comprises a second transmission antenna of a second wireless module that is different from the first-wireless module.

5. The device of claim 1, wherein the simultaneous transmission metric comprises a maximum permissive exposure for summed emissions of both the first wireless transmission platform and the second wireless transmission platform.

6. The device of claim 1, wherein the first transmit power is below a permitted transmit power for the first wireless transmission platform, wherein the permitted transmit power is based on a compliance level threshold of human exposure to emitted radiation from only the first wireless transmission platform.

7. The device of claim 1, wherein the first transmit power is below a permitted transmit power for the first wireless transmission platform, wherein the permitted transmit power is based on a compliance level threshold of human exposure to emitted radiation from the first wireless transmission platform and a maximum permitted transmit power for the second wireless transmission platform.

8. The device of claim 1, wherein the processor comprises a host processor for the device, wherein the processor configured to control the first wireless transmission platform to transmit with the first transmission power comprises the processor configured to:

send a first instruction to a first wireless module processor of the first wireless transmission platform, wherein the first wireless module processor is different from the processor; and send a second instruction to a second wireless module processor of the second wireless transmission platform, wherein the second wireless module processor is different from the processor.

9. The device of claim 8, further comprising:

a first system-on-chip comprising the first wireless transmission platform and first wireless module processor; and a second system-on-chip device comprising the second wireless transmission platform and second wireless module processor.

10. The device of claim 1, wherein the available transmission power is based on an estimation of emitted radiation from the first wireless transmission platform or the second wireless transmission platform.

11. The device of claim 1, wherein the available transmission power is based on a predefined margin for maintaining an individual compliance level threshold of human exposure to emitted radiation from the first wireless transmission platform or from the second wireless transmission platform.

12. The device of claim 1, wherein the available transmission power comprises an overall budget for a superposed equivalent isotropic radiated power from the device at the transmission time.

13. The device of claim 1, wherein the predefined criterion for the estimated transmission performance comprises a minimum combined throughput of or a maximum latency of the first wireless transmission platform or of the second wireless transmission platform.

14. The device of claim 1, wherein the processor is further configured to determine the predefined criterion based on the current channel condition of the first wireless transmission platform or of the second wireless transmission platform.

15. The device of claim 1, wherein the processor configured to translate comprises the processor configured to determine an attenuation based on a slope of the throughput-versus-attenuation relationship.

16. The device of claim 1, wherein the throughput-versus-attenuation relationship comprises a corresponding reduction in throughput for each unit of reduction in a level of the first transmission power or the second transmission power.

17. The device of claim 1, wherein the processor configured to translate the predefined criterion to the first transmission power and the second transmission power comprises the processor configured to calculate a power change to the first transmission power or the second transmission power based on a lowest power that maintains a required minimum throughput of the first or second wireless transmission platform after the power change.

* * * * *